(12) United States Patent
He et al.

(10) Patent No.: US 11,889,560 B2
(45) Date of Patent: Jan. 30, 2024

(54) MITIGATING ACCESS CONGESTION ON A WIRELESS NETWORK

(71) Applicant: QUALCOMM Incorporated, San Diego, CA (US)

(72) Inventors: Linhai He, San Diego, CA (US); Miguel Griot, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/332,929

(22) Filed: May 27, 2021

(65) Prior Publication Data

US 2022/0386380 A1 Dec. 1, 2022

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
None
See application file for complete search history.

(56) References Cited

U.S. PATENT DOCUMENTS

| | | | | |
|---|---|---|---|---|
| 11,076,344 B1* | 7/2021 | Babaei | ........... | H04W 76/27 |
| 11,191,003 B2* | 11/2021 | Wirth | ........... | H04W 16/02 |
| 11,330,505 B2* | 5/2022 | Babaei | ........... | H04W 76/27 |
| 11,432,328 B2* | 8/2022 | Murray | ........... | H04W 74/002 |
| 11,523,437 B2* | 12/2022 | Li | ........... | H04W 72/23 |
| 2018/0124836 A1* | 5/2018 | Hong | ........... | H04W 74/008 |
| 2019/0327663 A1* | 10/2019 | Wirth | ........... | H04W 72/56 |
| 2020/0053794 A1* | 2/2020 | He | ........... | H04W 74/02 |

(Continued)

FOREIGN PATENT DOCUMENTS

| | | |
|---|---|---|
| EP | 2536242 A1 | 12/2012 |
| WO | WO-2021067921 A1 | 4/2021 |
| WO | WO-2022048344 A1 | 3/2022 |

OTHER PUBLICATIONS

3GPP TS 22.261: "3rd Generation Partnership Project, Technical Specification Group Services and System Aspects, Service Requirements for the 5G System, Stage 1 (Release 18)", 3GPP Standard, Technical Specification, 3GPP TS 22.261, 3rd Generation Partnership Project, Mobile Competence Centre, 650, Route Des Lucioles, F-06921 Sophia-Antipolis Cedex, France, vol. SA WG1, No. V18.2.0, pp. 1-85, XP052000383, Section 6.22.

(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. The method includes receiving a network access control broadcast including access control criteria associated with connecting to a base station, determining an access category associated with the UE and an access identity of the UE associated with the access category, where the access category of the UE is specific to a reduced capability classification of the UE, and selectively performing a random access procedure to connect to the base station in accordance with the access control criteria, the access identity of the UE, and the access category associated with the UE.

26 Claims, 12 Drawing Sheets

(56) References Cited

U.S. PATENT DOCUMENTS

| | | | | |
|---|---|---|---|---|
| 2020/0120713 | A1* | 4/2020 | Yerramalli | H04W 74/0833 |
| 2021/0329692 | A1* | 10/2021 | Taherzadeh Boroujeni | ................ H04L 27/261 |
| 2021/0345227 | A1* | 11/2021 | Babaei | H04W 48/10 |
| 2021/0368550 | A1* | 11/2021 | Sharma | H04W 48/02 |
| 2022/0386380 | A1* | 12/2022 | He | H04W 74/006 |
| 2023/0041263 | A1* | 2/2023 | Li | H04W 72/0446 |

OTHER PUBLICATIONS

CATT: "Discussion on Higher Layer Support of RedCap", 3GPP TSG RAN WG1 #105-e, R1-2104530, 3rd Generation Partnership Project, Mobile Competence Centre, 650, Route Des Lucioles, F-06921 Sophia-Antipolis Cedex, France, vol. RAN WG1, No. e-Meeting, May 19, 2021-May 27, 2021, May 12, 2021, XP052010853, 5 Pages, Section 2.3.

Intel Corporation: "CE Level Based Access Barring and Load Control for eFeMTC" 3GPP TSG RAN WG2 Meeting #102, R2-1807521 (Resubmission of R2-1804898), Access Barring, 3rd Generation Partnership Project, Mobile Competence Centre, 650, Route Des Lucioles, F-06921 Sophia-Antipolis Cedex, France, vol. RAN WG2, No. Busan, Republic of Korea, May 21, 2018-May 25, 2018, May 20, 2018, XP051443891, 3 Pages, Sections 2.2, 2.3.

Partial International Search Report—PCT/US2022/030401—ISA/EPO—dated Aug. 16, 2022.

Xiaomi Communications: "Discussion on UAC for Redcap Devices", 3GPP TSG-RAN WG2 Meeting #114 electronic, R2-2105071, 3rd Generation Partnership Project, Mobile Competence Centre, 650, Route Des Lucioles, F-06921 Sophia-Antipolis Cedex, France, vol. RAN WG2, No. Online, May 19, 2021-May 27, 2021, May 11, 2021, XP052006770, 2 Pages, Sections 2, 3.

Huawei., et al., "Initial Access Procedure in NR Unlicensed", 3GPP TSG RAN WG1 Meeting #99, R1-1911867, 3rd Generation Partnership Project (3GPP), Mobile Competence Centre, 650, Route Des Lucioles, F-06921 Sophia-Antipolis Cedex, France, vol. RAN WG1, No. Renor USA, Nov. 18, 2019-Nov. 22, 2019, Nov. 9, 2019, 12 Pages, XP051823049, The whole document.

International Search Report and Written Opinion—PCT/US2022/030401—ISA/EPO—dated Oct. 12, 2022.

OPPO: "Enhancements of 4-steps RACH in NR-U", R2-1903283, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 6, 2019-Apr. 12, 2019, Apr. 6, 2019, pp. 1-4, XP051700632, Section 2.2.

* cited by examiner

MITIGATING ACCESS CONGESTION ON A WIRELESS NETWORK

FIELD OF TECHNOLOGY

The following relates to wireless communications, including mitigating access congestion on a wireless network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may experience congestion when multiple devices contend for relatively sparse random access resources. In some cases, it may be desirable to mitigate such instances of access congestion.

SUMMARY

The described techniques relate to improved methods, systems, devices, and apparatuses that support mitigating access congestion on a wireless network. Generally, the described techniques provide for a user equipment (UE) receiving a network access control broadcast comprising access control criteria associated with accessing a base station and mitigating access congestion associated with the base station. To mitigate the access congestion, the UE determines its access category. In some cases, the UE may determine an access identity of the UE associated with its access category. In some cases, the UE may be a reduced capability UE and the access category of the UE may specify the reduced capability classification of the UE. To mitigate the access congestion, the UE selectively performs a random access procedure to access the base station in accordance with the access control criteria, or the access identity of the UE, or the access category associated with the UE, or any combination thereof.

A method for wireless communication at a user equipment (UE) is described. The method may include receiving a network access control broadcast including access control criteria associated with connecting to a base station, determining an access category associated with the UE and an access identity of the UE associated with the access category, where the access category of the UE is specific to a reduced capability classification of the UE, and selectively performing a random access procedure to connect to the base station in accordance with the access control criteria, the access identity of the UE, and the access category associated with the UE.

An apparatus for wireless communication at a UE is described. The apparatus may include at least one processor, memory coupled with the at least one processor, and instructions stored in the memory. The instructions may be executable by the at least one processor to cause the apparatus to receive a network access control broadcast including access control criteria associated with connecting to a base station, determine an access category associated with the UE and an access identity of the UE associated with the access category, where the access category of the UE is specific to a reduced capability classification of the UE, and selectively perform a random access procedure to connect to the base station in accordance with the access control criteria, the access identity of the UE, and the access category associated with the UE.

Another apparatus for wireless communication at a UE is described. The apparatus may include means for receiving a network access control broadcast including access control criteria associated with connecting to a base station, means for determining an access category associated with the UE and an access identity of the UE associated with the access category, where the access category of the UE is specific to a reduced capability classification of the UE, and means for selectively performing a random access procedure to connect to the base station in accordance with the access control criteria, the access identity of the UE, and the access category associated with the UE.

A non-transitory computer-readable medium storing code for wireless communication at a UE is described. The code may include instructions executable by at least one processor to receive a network access control broadcast including access control criteria associated with connecting to a base station, determine an access category associated with the UE and an access identity of the UE associated with the access category, where the access category of the UE is specific to a reduced capability classification of the UE, and selectively perform a random access procedure to connect to the base station in accordance with the access control criteria, the access identity of the UE, and the access category associated with the UE.

In some examples of the method, apparatuses, and non-transitory computer-readable medium described herein, selectively performing the random access procedure may include operations, features, means, or instructions for performing the random access procedure in accordance with determining from the access control criteria that the access identity of the UE may have full access to the base station.

In some examples of the method, apparatuses, and non-transitory computer-readable medium described herein, receiving the network access control broadcast may include operations, features, means, or instructions for receiving, in a broadcast from the base station, a set of measurement thresholds associated with one or more synchronization signal blocks.

Some examples of the method, apparatuses, and non-transitory computer-readable medium described herein may further include operations, features, means, or instructions for performing a reference signal received power measurement on the one or more of synchronization signal blocks and identifying a smallest threshold of the set of measurement thresholds that may be greater than the reference signal received power measurement performed by the UE, where the access control criteria indicates a backoff period associated with the identified smallest threshold.

In some examples of the method, apparatuses, and non-transitory computer-readable medium described herein, selectively performing the random access procedure includes performing the random access procedure after the backoff period associated with the identified smallest threshold.

In some examples of the method, apparatuses, and non-transitory computer-readable medium described herein, selectively performing the random access procedure may include operations, features, means, or instructions for performing the random access procedure in accordance with a probabilistic barring factor associated with the identified smallest threshold.

In some examples of the method, apparatuses, and non-transitory computer-readable medium described herein, the access identity of the UE may be based on a number of receive antennas associated with the UE or a number of downlink layers supported by the UE.

In some examples of the method, apparatuses, and non-transitory computer-readable medium described herein, one or more of the access identity of the UE or the access category of the UE may be specific to an operator associated with the base station.

In some examples of the method, apparatuses, and non-transitory computer-readable medium described herein, the network access control broadcast includes a system information message.

A method for wireless communication at a UE is described. The method may include transmitting a first random access preamble to a base station, the first random access preamble including a preamble index associated with the UE, receiving a random access response from the base station, the random access response including an indication of a dynamic random access configuration and a set of multiple dynamic uplink grants, applying either the dynamic random access configuration or a randomly selected uplink grant of the set of multiple dynamic uplink grants to the UE, where the applying is based on whether the random access response includes the preamble index associated with the UE, and transmitting a second random access preamble to the base station in accordance with the applied dynamic random access configuration or the applied randomly selected uplink grant.

An apparatus for wireless communication at a UE is described. The apparatus may include at least one processor, memory coupled with the at least one processor, and instructions stored in the memory. The instructions may be executable by the at least one processor to cause the apparatus to transmit a first random access preamble to a base station, the first random access preamble including a preamble index associated with the UE, receive a random access response from the base station, the random access response including an indication of a dynamic random access configuration and a set of multiple dynamic uplink grants, apply either the dynamic random access configuration or a randomly selected uplink grant of the set of multiple dynamic uplink grants to the UE, where the applying is based on whether the random access response includes the preamble index associated with the UE, and transmit a second random access preamble to the base station in accordance with the applied dynamic random access configuration or the applied randomly selected uplink grant.

Another apparatus for wireless communication at a UE is described. The apparatus may include means for transmitting a first random access preamble to a base station, the first random access preamble including a preamble index associated with the UE, means for receiving a random access response from the base station, the random access response including an indication of a dynamic random access configuration and a set of multiple dynamic uplink grants, means for applying either the dynamic random access configuration or a randomly selected uplink grant of the set of multiple dynamic uplink grants to the UE, where the applying is based on whether the random access response includes the preamble index associated with the UE, and means for transmitting a second random access preamble to the base station in accordance with the applied dynamic random access configuration or the applied randomly selected uplink grant.

A non-transitory computer-readable medium storing code for wireless communication at a UE is described. The code may include instructions executable by at least one processor to transmit a first random access preamble to a base station, the first random access preamble including a preamble index associated with the UE, receive a random access response from the base station, the random access response including an indication of a dynamic random access configuration and a set of multiple dynamic uplink grants, apply either the dynamic random access configuration or a randomly selected uplink grant of the set of multiple dynamic uplink grants to the UE, where the applying is based on whether the random access response includes the preamble index associated with the UE, and transmit a second random access preamble to the base station in accordance with the applied dynamic random access configuration or the applied randomly selected uplink grant.

In some examples of the method, apparatuses, and non-transitory computer-readable medium described herein, applying either the dynamic random access configuration or the randomly selected uplink grant may include operations, features, means, or instructions for applying the dynamic random access configuration to the UE when the preamble index associated with the UE may be absent from the random access response.

In some examples of the method, apparatuses, and non-transitory computer-readable medium described herein, the random access response includes an indication of a priority level associated with eligibility to use the dynamic random access configuration, and applying the dynamic random access configuration may be further based on a comparison of a priority level associated with the UE and the priority level associated with eligibility to use the dynamic random access configuration.

In some examples of the method, apparatuses, and non-transitory computer-readable medium described herein, the dynamic random access configuration may be applied at the UE instead of a broadcast random access configuration.

In some examples of the method, apparatuses, and non-transitory computer-readable medium described herein, applying either the dynamic random access configuration or the randomly selected uplink grant may include operations, features, means, or instructions for applying the randomly selected uplink grant to the UE when the random access response includes the preamble index associated with the UE.

In some examples of the method, apparatuses, and non-transitory computer-readable medium described herein, the random access response associates the set of multiple dynamic uplink grants with the preamble index associated with the UE, and each of the set of multiple dynamic uplink grants includes a unique temporary cell radio network temporary identifier (TC-RNTI).

DETAILED DESCRIPTION

Figure 1:
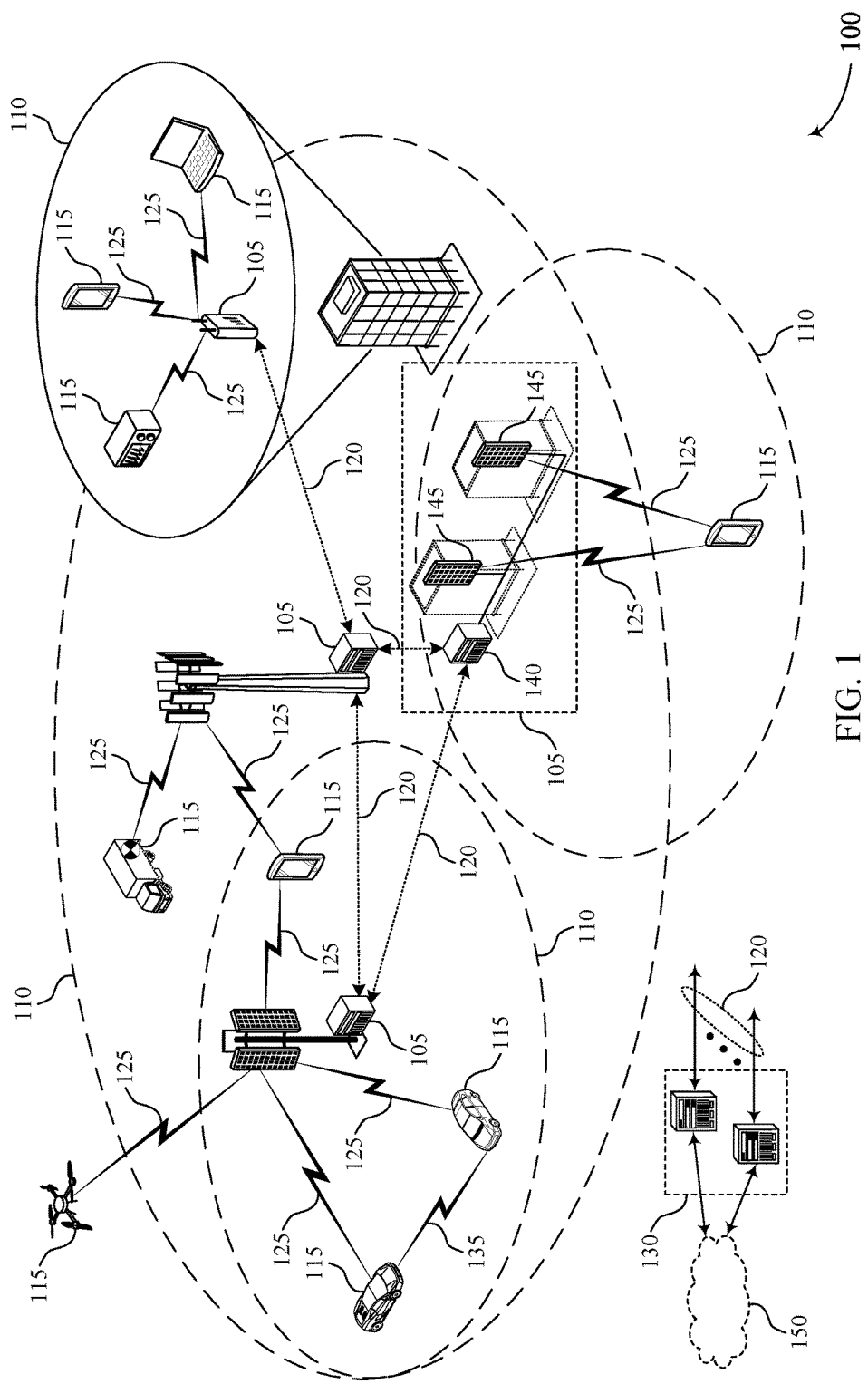
FIG. 1 illustrates an example of a wireless communications system that supports mitigating access congestion on a wireless network in accordance with aspects of the present disclosure.

The present techniques include mitigating access congestion on a wireless network. Some wireless networks may not be configured to handle relatively high levels of congestion, resulting in any combination of data network failures, low quality of service, and poor user experience. In some wireless systems (e.g., NR, 5G), access congestion may be handled by Universal Access Control (UAC) protocol in which a UE determines any random access restrictions based on an access identity of the UE and an access category of data to be transmitted or received prior to performing random access with a base station. In some cases, congestion may occur when different classes of UEs attempt to access a network at the same time. The different classes of UEs may include legacy or standard UEs (e.g., smartphones, cellular-connected personal computing devices, cellular-connected handheld devices, etc.) as well as reduced capability UEs. In some cases, reduced capability UEs may include reduced low-capability UEs (e.g., 3GPP RLC-UEs), internet of things devices, sensors, actuators, gadgets, appliances, or machines that are programmed for some application (e.g., a dedicated application, dedicated function). In some cases, UEs configured with a data throughput below a defined threshold may be considered reduced capability UEs. In some cases, reduced capability UEs may implement a subset (e.g., only a subset) of the wireless capabilities of legacy or standard UEs. In some cases, reduced capability UEs may be embedded industrial equipment, environmental sensors, medical devices, etc. In some cases, reduced capability UEs may be deployed in relatively high numbers. Thus, reduced capability UEs may be more likely to cause access congestion (e.g., on a random access channel, physical random access channel (PRACH), etc.) than legacy UEs.

In a first solution of the present disclosure, different access categories and access control criteria may be specific to reduced capability UEs. In some cases, for a given service a base station may configure first universal access control (UAC) parameters for legacy UEs and configure second UAC parameters for reduced capability UEs for the same service. By treating legacy UEs and reduced capability UEs differently, a base station may better mitigate congestion between different classes of UEs (e.g., reduced capability UEs and non-reduced capability UEs) by imposing more strict UAC requirements on reduced capability UEs than on non-reduced capability UEs.

The second solution of the present disclosure relieves network congestion during random access by modifying a random access procedure to dynamically provide additional RACH resources to UEs that do not find their preamble index in a random access response (RAR) message from the base station. The RAR message may be a message from a 4-step random access procedure (e.g., message 2) or a message from a 2-step random access procedure (e.g., message B). In some examples, a UE that does not find its preamble index in a RAR message may identify a PRACH configuration index in the RAR message that signals additional RACH resources that the UE may use to reattempt the RACH process. The availability PRACH configuration index may be based on the priority of the UE. In some examples, a UE that does receive its preamble index in a RAR message may be provided with one or more sets UL grants, where at least one set of UL grants corresponds to its preamble index and each UL grant may be associated with a different radio network temporary identifier (RNTI). In some cases, the UE may randomly select one of the UL grants in the set of UL grants corresponding to its preamble index. Providing multiple UL grants and the UE selecting a UL grant randomly reduces the probability of collisions by multiple UEs using the same RACH preamble index.

Aspects of the subject matter described herein may be implemented to realize one or more advantages. The described techniques may support improvements in access control and resource utilization such that access congestion on a wireless network is mitigated. Additionally, described techniques may result in avoiding multiple retransmissions and failed transmissions, decreasing system latency, improving the reliability of a random access procedure, and improving user experience.

Aspects of the disclosure are initially described in the context of wireless communications systems. Aspects of the disclosure are further illustrated by and described with reference to random access responses and process flows that relate to mitigating access congestion on a wireless network. Aspects of the disclosure are further illustrated by and described with reference to apparatus diagrams, system diagrams, and flowcharts that relate to mitigating access congestion on a wireless network.

FIG. 1 illustrates an example of a wireless communications system 100 that supports mitigating access congestion on a wireless network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for communication links 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over communication links 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The described techniques provide for a UE 115 receiving a network access control broadcast comprising access control criteria associated with accessing a base station 105 and mitigating access congestion associated with the base station 105. To mitigate the access congestion, UE 115 determines its access category. In some cases, UE 115 may determine an access identity of the UE associated with its access category. In some cases, UE 115 may be a reduced capability UE and the access category of UE 115 may specify the reduced capability classification of UE 115. To mitigate the access congestion, UE 115 selectively performs a random access procedure to access the base station in accordance with the access control criteria, or the access identity of UE 115, or the access category associated with UE 115, or any combination thereof.

The present techniques improve a base station's handling of relatively high levels of congestion, thereby avoiding data network failures, maintaining a quality of service, and improving user experience during high levels of congestion. The described techniques may support improvements in access control and resource utilization such that access congestion on a base station 105 is mitigated. Described techniques may result in avoiding multiple retransmissions and failed transmissions, decreasing system latency, improving the reliability of a random access procedure, and improving user experience.

Figure 2:
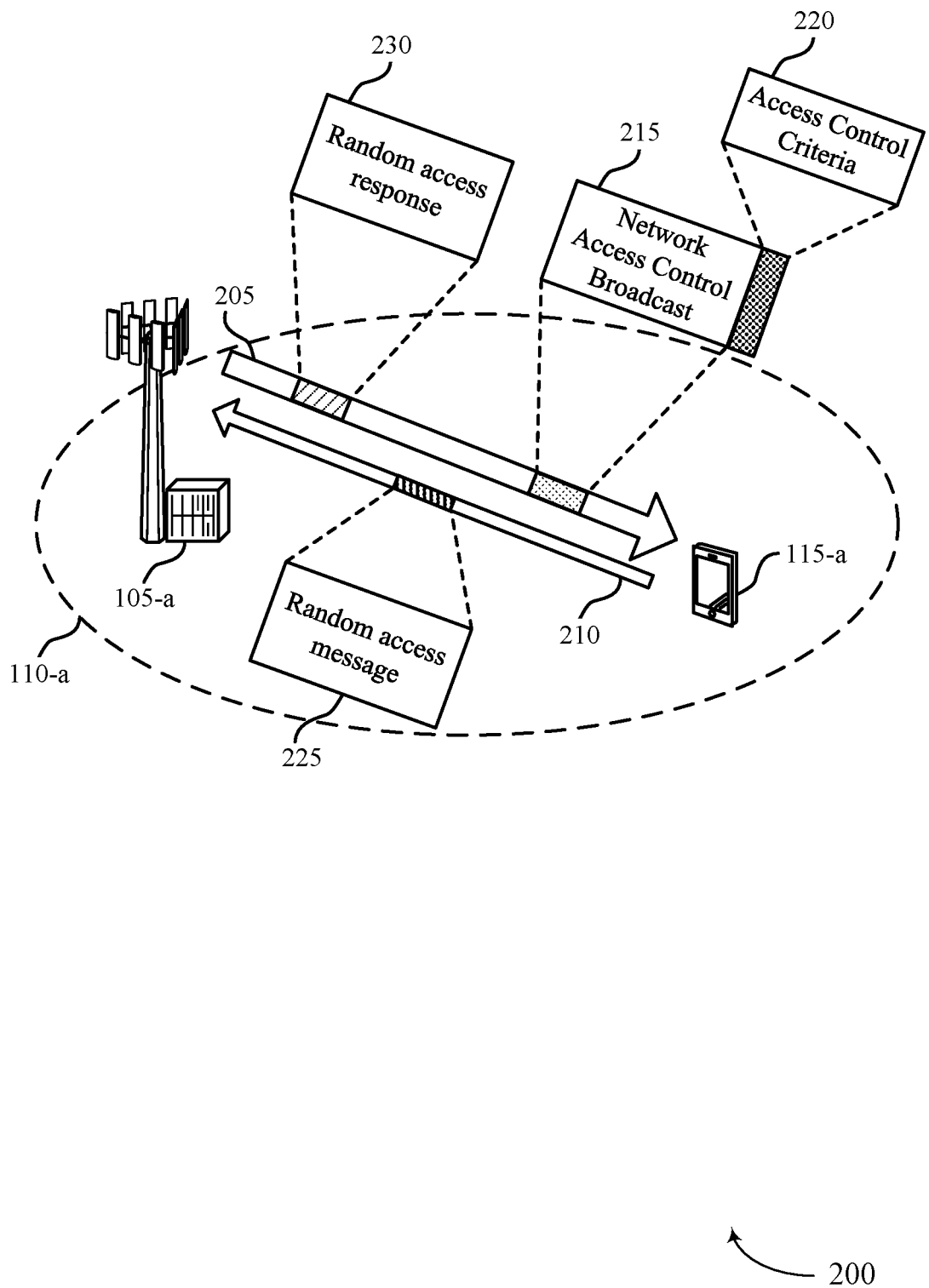
FIG. 2 illustrates an example of a wireless communication system that supports mitigating access congestion on a wireless network in accordance with aspects of the present disclosure.

FIG. 2 illustrates an example of a wireless communications system 200 that supports mitigating access congestion on a wireless network in accordance with aspects of the present disclosure.

As illustrated, wireless communications system 200 may include UE 115-*a* and base station 105-*a*, which may be examples of a UE 115 or a base station 105, as described above with reference to FIG. 1. Wireless communications system 200 may also include downlink 205 and uplink 210. Base station 105-*a* may use downlink 205 to convey control and/or data information to UE 115-*a*. And UE 115-*a* may use uplink 210 to convey control and/or data information to base station 105-*a*. In some cases, downlink 205 may use different time and/or frequency resources than uplink 210. As depicted, base station 105-*a* may be associated with geographic coverage area 110-*a* in which communications with one or more UEs (e.g., UE 115-*a*) are supported.

In some examples, UE 115-*a* may receive a network access control broadcast 215 from base station 105-*a*. In some cases, the network access control broadcast 215 may include access control criteria 220 associated with UE 115-*a* accessing base station 105-*a*. In some cases, network access control broadcast 215 may include a system information message.

In some examples, UE 115-*a* may determine its access category (e.g., based on UE 115-*a* requesting access to base station 105-*a*). In some cases, UE 115-*a* may determine an access identity of the UE associated with its access category. In some cases, the access category of UE 115-*a* is specific to a reduced capability classification of UE 115-*a* (e.g., the access category UE 115-*a* classifies UE 115-*a* as a reduced capability UE). In some cases, the access category may be based on or include a service running on UE 115-*a* that triggers UE 115-*a* to attempt to initiate the random access procedure (e.g., to transmit random access message 225). In some cases, the access identity may be based on or include a high priority subscription, or a medium priority subscription, or a low priority subscription, or a mission critical subscription, or any combination thereof.

In some examples, UE 115-*a* may selectively perform a random access procedure to connect to base station 105-*a* in accordance with the access control criteria 220, the access identity of the UE, and the access category associated with the UE. In some cases, UE 115-*a* selectively performing the random access procedure may include UE 115-*a* performing the random access procedure in accordance with determining from the access control criteria 220 that the access identity of the UE associated with UE 115-*a* has full access to base station 105-*a*.

In some examples, the random access procedure performed by UE 115-*a* may include UE 115-*a* transmitting a random access message 225 to base station 105-*a*. In some cases, UE 115-*a* may transmit a random access preamble in the random access message 225, where the random access preamble includes a preamble index associated with UE 115-*a*.

In some examples, base station 105-*a* may transmit a random access response 230 to UE 115-*a*. In some cases, base station 105-*a* may transmit the random access response 230 in response to base station 105-*a* receiving the random access message 225 from UE 115-*a*.

In some examples, UE 115-*a* may configure an access category or access identity based on one or more attributes associated with base station 105-*a* or the access control criteria 220, or both. In some cases, the one or more attributes may include a quality of service indictor (e.g., 5G quality of service indictor (5QI)). In some cases, the one or more attributes may include or may be based on standardized access categories.

In some examples, the access identity of UE 115-*a* may include a priority of UE 115-*a*. The priority of UE 115-*a* may, for example, be based on a number of receive antennas implemented in UE 115-*a*, or on a number of downlink layers that UE 115-*a* supports, or both. In some cases, UE 115-*a* may have multiple receive antennas that enable UE 115-*a* to support relatively higher numbers of downlink layers than UE configured with fewer receive antennas. Accordingly, UE 115-*a* may have a higher access priority than UEs with fewer receive antennas. In some cases, when the configuration (e.g., number of antennas, number of layers) of UE 115-*a* satisfies (e.g., exceeds, exceeds or is equal to) an access identity threshold (e.g., antenna threshold, layer threshold), then UE 115-*a* may be permitted to proceed with its attempt to establish the connection with base station 105-*a* (e.g., transmit random access message 225). When the configuration of UE 115-*a* does not satisfy (e.g., does not exceed or is equal to, does not exceed) the access identity threshold, then UE 115-*a* may be at least temporarily barred from establishing a connection with base station 105-*a*. In some cases, UE 115-*a* may wait a period of time (e.g., backing off period, a period of time specified in the access control criteria 220, a barring time, etc.) before attempting or making another attempt to access base station 105-*a*.

In some examples, a first UE with only one receive antenna located at a cell center of base station 105-*a* may require fewer resources to serve than a second UE with four receive antennas located at a cell edge of base station 105-*a*. Accordingly, in some cases, base station 105-*a* may estimate a number of shared channel repetitions (e.g. PDSCH/PUSCH repetitions) that would be involved in an access by the first UE compared to an access by the second UE (e.g., based on one or more measurements from the first UE and the second UE.

In some examples, access control may be based on an expected level of coverage enhancement for UE 115-*a*. In some cases, base station 105-*a* may determine the expected level of coverage enhancement of UE 115-*a* before allowing UE 115-*a* to complete a random access procedure. In some examples, base station 105-*a* may link or associate random access channel resource configurations of one or more UEs (e.g., UE 115-*a*) with varying levels of coverage enhancement constraints. In some examples, UE 115-*a* may be configured with a coverage enhancement out of multiple coverage enhancements (e.g., configured with one of four levels of coverage enhancements). In some cases, a set of random access channel occasions may be defined for each level of coverage enhancements. In some cases, UE 115-*a* may be configured to use a different set of random access channel preambles within each random access channel occasion. In some cases, the longer the random access channel preamble is, the more reliable the random access channel preamble may be. Thus, the larger the coverage enhancement may be expected to be for a given UE (e.g., UE 115-*a*), the longer the random access channel preamble may be.

In some examples, UE 115-*a* may perform, based on its access identity, one or more pre-access operations to determine whether it may access base station 105-*a*. In some cases, UE 115-*a* may determine whether its access identity has full access to base station 105-*a*. When UE 115-*a* determines its access identity indicates it has full access, UE 115-*a* may initiate a random access procedure (e.g., transmit random access message 225) without performing any further pre-access operations.

In some examples, UE 115-*a* may attempt to access (e.g., establish a connection with) base station 105-*a* based on one or more barring factors (e.g., one or more probabilistic barring factors). In some cases, the access control criteria 220 may stipulate the one or more barring factors. The one or more barring factors may include one or more probability values (e.g., one or more probability values transmitted in network access control broadcast 215). When UE 115-*a* determines that it does not have full access (e.g., UE 115-*a* is subject to barring), UE 115-*a* may perform additional pre-access operations (e.g., determine a smallest threshold that is greater than a measurements on synchronization signal blocks, etc.). In some cases, UE 115-*a* may receive (e.g., in network access control broadcast 215) a set of measurement thresholds associated with one or more synchronization signal blocks. In some cases, each measurement threshold may be associated with a set of access control parameters (e.g., a barring factor, a barring time, etc.). In some cases, UE 115-*a* may perform a reference signal received power measurement on the one or more of synchronization signal blocks. In some cases, UE 115-*a* may identify a smallest threshold of the set of thresholds that is greater than the reference signal received power measurement performed by UE 115-*a*. In some cases, access control criteria 220 indicates a backoff period associated with the identified smallest threshold. In some cases, UE 115-*a* selectively performing the random access procedure may include UE 115-*a* performing the random access procedure after the backoff period associated with the identified smallest threshold. In some cases, UE 115-*a* selectively performing the random access procedure may include UE 115-*a* performing the random access procedure in accordance with a barring factor associated with the identified smallest threshold.

In some examples, UE 115-*a* may perform an access attempt (e.g., transmit random access message 225) when the probability value computed by UE 115-*a* satisfies the barring factor. In some cases, UE 115-*a* may compare a barring factor received in access control criteria 220 to a probability value randomly generated by UE 115-*a* in accordance with the access identity of UE 115-*a* indicating UE 115-*a* is at least temporarily barred from accessing base station 105-*a*. In some cases, UE 115-*a* may wait for a barring time (e.g., backoff period) to elapse before performing the access attempt when the probability value computed by UE 115-*a* does not satisfy the barring factor.

The present techniques may improve access control and resource utilization such that access congestion on base station 105-*a* is mitigated. The present techniques may reduce power consumption and free up processing cycles of one or more devices (e.g., battery-operated devices, UE 115-*a*, etc.) by selectively allowing UEs (e.g., UE 115-*a*) to perform random access procedures, thus improving user experience of the one or more devices with longer battery life and improved quality of service.

Figure 3:
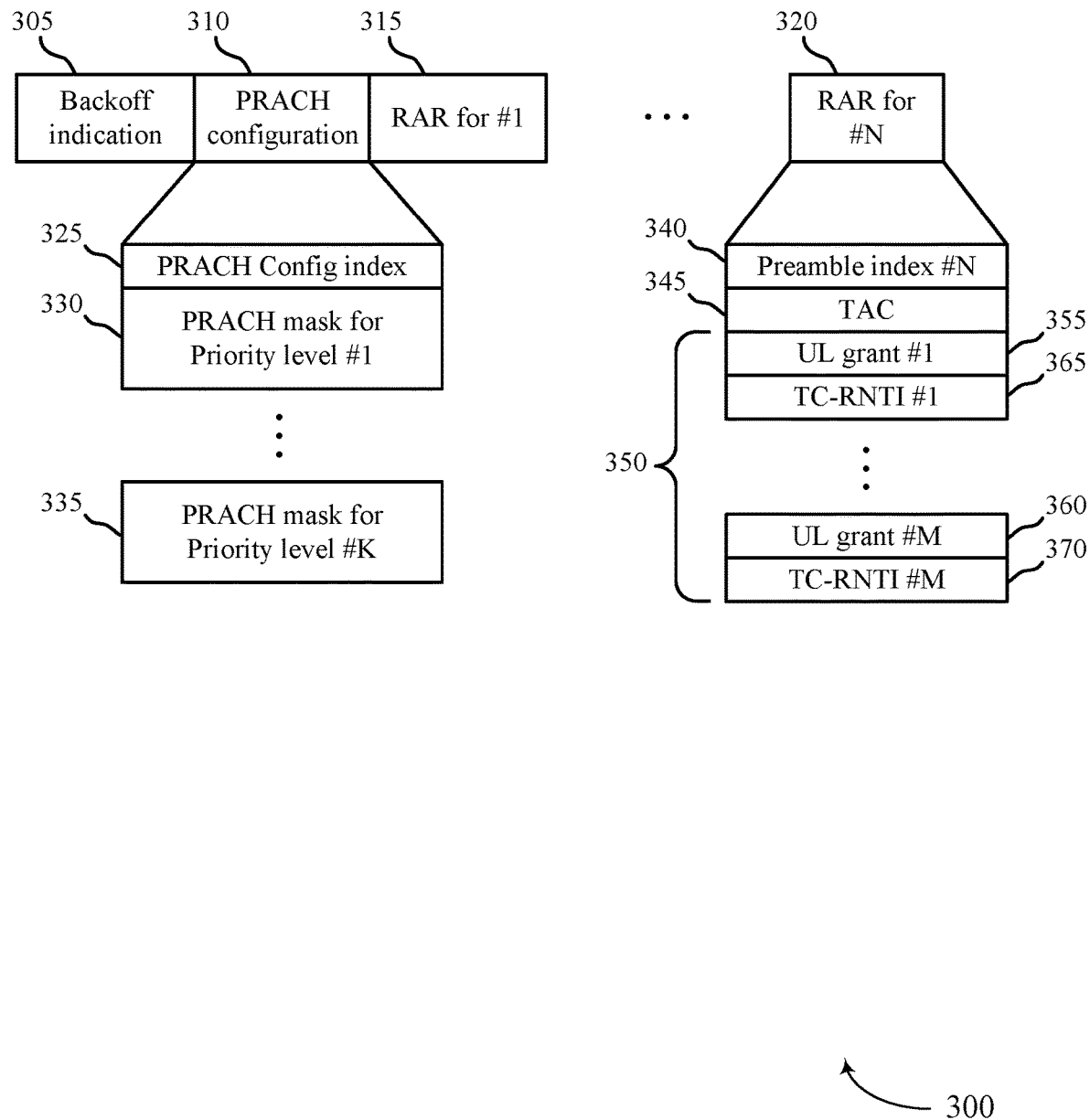
FIG. 3 illustrates an example of a random access response that supports mitigating access congestion on a wireless network in accordance with aspects of the present disclosure.

FIG. 3 illustrates an example of a random access response (RAR) message 300 that supports mitigating access congestion on a wireless network in accordance with aspects of the present disclosure.

In the illustrated example, RAR message 300 may include a backoff indication 305, PRACH configuration 310, a RAR 315 for a first preamble index, up to a RAR 320 for an Nth preamble index. RAR message 300 may include a RAR of a 4-step random access procedure or a message B (msgB) response of a 2-step random access procedure. Some RAR messages may include a backoff indication and one or more RARs. However, the present techniques introduce the PRACH configuration 310 to RAR messages (e.g., RAR message 300) to provide dynamically signaled PRACH resources. As shown, the PRACH configuration 310 may include PRACH configuration index 325, and PRACH mask 330 for a first priority level up to a PRACH mask 335 for a Kth priority level.

In the illustrated example, RAR 320 may include preamble index 340 for the Nth preamble index, a time alignment command (TAC) 345, and a set of uplink grants 350, each with a corresponding radio network temporary identifier (RNTI), for the Nth preamble index. Some RARs of RAR messages may include a preamble index and a time alignment command (TAC). However, the present techniques introduce the set of uplink grants 350, each with a corresponding RNTI, to an RAR (e.g., RAR 320).

Legacy Access control may avoid RACH congestion over relatively long periods of time, but short-term RACH congestion may still occur in cases of high-density deployment. For example, an unexpected event (e.g., a broken water main) may trigger all water sensors in the same area to send data to their server, resulting in access congestion since access control is not able to react to all the water sensors at once (e.g., a system information modification period typically may be longer than a RACH configuration period). Accordingly, the present techniques provide additional (e.g., dynamic) resources in RAR message to mitigate congestion.

For a UE (e.g., a UE 115) among one or more UEs that do not find their preamble index in RAR message 300, the base station may provide a PRACH configuration index in PRACH configuration 310. In some cases, the base station may indicate (e.g., in PRACH configuration 310) which priority level or priority levels of the one or more UEs may use the dynamically signaled PRACH resources of PRACH configuration 310 (e.g., PRACH mask 330, PRACH mask 335). In some cases, those UEs with eligible priority levels may use the dynamically signaled PRACH resources instead of the PRACH resources broadcast by the base station for a next attempt at completing a random access procedure (e.g., for the next attempt only).

After the UE sends its random access preamble, the UE monitors the random access response search space for a RAR message (e.g., RAR message 300) from the base station. In some cases, one or more UEs may identify their respective preambles in the preamble indices of RAR message 300 (e.g., the respective preamble indices are included in RAR message 300), and in some cases, one or more UEs may not identify their respective preambles in the preamble indices of RAR message 300 (e.g., the respective preamble indices are not included in RAR message 300).

When RAR message 300 does not include the preamble index of the UE (e.g., the UE does not find its preamble index in the preamble indices of RAR message 300), then the UE knows that its access attempt has failed. When the base station is unsuccessful in decoding the preamble transmitted by the UE, then the access attempt by the UE is considered failed. When one or more UEs do not find their preamble in the random access preamble indices transmitted by the base station (e.g., because the base station was unsuccessful in decoding the random access preambles transmitted by those UEs), the base station may provide additional random access resources for each of those UEs (e.g., the same random access resources for the multiple UEs). The additional random access resources may include PRACH configuration 310 or the set of uplink grants 350, or both.

For those UEs whose access attempts fail, the base station may provide the additional random access resources in RAR message 300 (e.g., in addition to random access resources that the base station broadcasts to the UEs). In some cases, when the base station was unsuccessful in decoding the random access preamble transmitted by a UE, the base station may not realize that the UE has attempted to access the base station. Accordingly, the base station may blindly provide the additional random access resources for those UEs that failed to access the base station.

In some cases, the additional random access resources may be indicated in a random access channel configuration (e.g., PRACH configuration 310) added to RAR message 300. As shown, PRACH configuration 310 may include PRACH configuration index 325 to indicate which random access configuration a UE should use in relation to the additional random access resources.

In some examples, RAR message 300 may include one or more random access channel masks (e.g., PRACH mask 330, PRACH mask 335, etc.). In some cases, the UE may apply a random access channel mask of PRACH configuration 310 in relation to PRACH configuration index 325. In some cases, the random access channel mask may indicate to the UE which random access occasions associated with the PRACH configuration 310 that the UE may use. In some cases, a first random access channel mask (e.g., PRACH mask 330, PRACH mask 335, etc.) may indicate that the UE may use every random access occasion associated with PRACH configuration 310. In some cases, a second random access channel mask (e.g., PRACH mask 330, PRACH mask 335, etc.) may indicate that the UE may use a portion of the random access occasions (e.g., PRACH mask 330 specifies every other random access occasion, PRACH mask 335 specifies one of every three random access occasions, while another PRACH mask specifies all random access occasions, etc.) associated with the PRACH configuration 310.

In some examples, a UE may be eligible to use the additional random access resources based a priority of the UE. In some cases, an eligible UE may use the additional random access resources (e.g., instead of the random access resources broadcast by the base station) for a next attempt to access the base station (e.g., the additional random access resources may be used only on the next attempt after receiving them). In some cases, the base station may indicate which priority level(s) of UEs are assigned to PRACH configuration 310 and associated random access channel mask (e.g., to access the additional random access resources). In some cases, the base station may indicate a priority level threshold, where those UEs with a priority level that satisfies (e.g., greater than, greater than or equal to, less than, less than or equal to, etc.) the priority level threshold are assigned to PRACH configuration 310 and associated random access channel mask (e.g., PRACH mask 330, PRACH mask 335, etc.).

In some examples, the base station may configure the random access channel masks based on the priority of UEs. In some cases, a high priority UE may be assigned a first random access channel mask that indicates the high priority UE may use every random access occasion associated with PRACH configuration 310, while a low priority UE may be assigned a second random access channel mask that indicates the low priority UE may use a portion of the random access occasions associated with PRACH configuration 310.

In some examples, a UE may identify its preamble in the preamble indices of RAR message 300 when the base station successfully decodes the random access preamble transmitted by that UE. The random access preamble transmitted by this UE may include a random access preamble index associated with the UE (e.g., a random access preamble index particular to the UE or to a subset of UEs that includes the UE). When the UE identifies its preamble index among the preamble indices, the UE may continue the random access procedure to access the base station (e.g., the UE may determine it is clear to continue the random access procedure).

In some cases, two UE may happen to select (e.g., randomly select) and transmit the same random access preamble to the base station. In such cases, the two UEs may receive the same uplink grant assignment and use the same uplink grant to access the base station, causing contention at the base station, which contention results in the random access procedure failing for these two UEs (e.g., these two UEs have to initiate new random access procedures to access the base station).

However, instead of providing one uplink grant per random access preamble, based on the present techniques, the base station may provide a set of uplink grants for those UEs that have succeeded in sending a random access preamble to the base station. In some cases, the base station determines how many uplink grants are included in a set of uplink grants based on one or more conditions (e.g., based on a level of congestion, etc.).

In some examples, the base station may provide multiple sets of uplink grants (e.g., set of uplink grants 350) in RAR message 300, where each set of uplink grants among the multiple sets corresponds to a random access preamble index included in RAR message 300 (e.g., a first set of uplink grants of the multiple sets of uplink grants corresponds to a first random access preamble index, a second set of uplink grants of the multiple sets of uplink grants corresponds to a second random access preamble index, etc.). When the UE identifies its preamble index among the preamble indices, the UE may identify a set of uplink grants (set of uplink grants 350 among multiple sets of uplink grants) that corresponds to its preamble index (e.g., corresponds to the preamble transmitted by the UE).

In some examples, a UE may randomly select an uplink grant (e.g., first uplink grant 355, Mth uplink grant 360, etc.) from the set of uplink grants 350. When the UE identifies set of uplink grants 350 corresponds to the random access preamble transmitted by the UE, the UE may randomly select one uplink grant from the uplink grants of set of uplink grants 350 to use to access the base station. Accordingly, when two UEs happen to select and transmit the same random access preamble to the base station, and the base station successfully decodes the random access preambles transmitted by these two UEs, RAR message 300 may include a set of uplink grants from which each of the two UE may randomly select an uplink grant from the set of uplink grants and use the randomly selected uplink grant to access the base station.

In some examples, each uplink grant of the set of uplink grants 350 may be paired with a unique RNTI. Because RAR message 300 is scrambled by RNTI (e.g., random access RNTI (RA-RNTI), temporary cell RNTI (TC-RNTI), etc.) that is associated with the random access occasion in which the UE transmits its random access preamble, RAR message 300 is targeted to a specific group of UEs (the group of UEs that transmitted random access preambles associated with the RNTI that the base station uses to scramble its random access response). In some cases, first uplink grant 355 may be associated with a first RNTI 365 (e.g., a first RNTI used by a first set of one or more UEs in association with transmitting respective random access preambles), a second uplink grant may be associated a second RNTI (e.g., a second RNTI used by a second set of one or more UEs in association with transmitting respective random access preambles), up to an Mth uplink grant 360 may be associated with an Mth RNTI 370 (e.g., an Mth RNTI used by an Mth set of one or more UEs in association with transmitting respective random access preambles, M being a positive integer), and so on.

Figure 4:
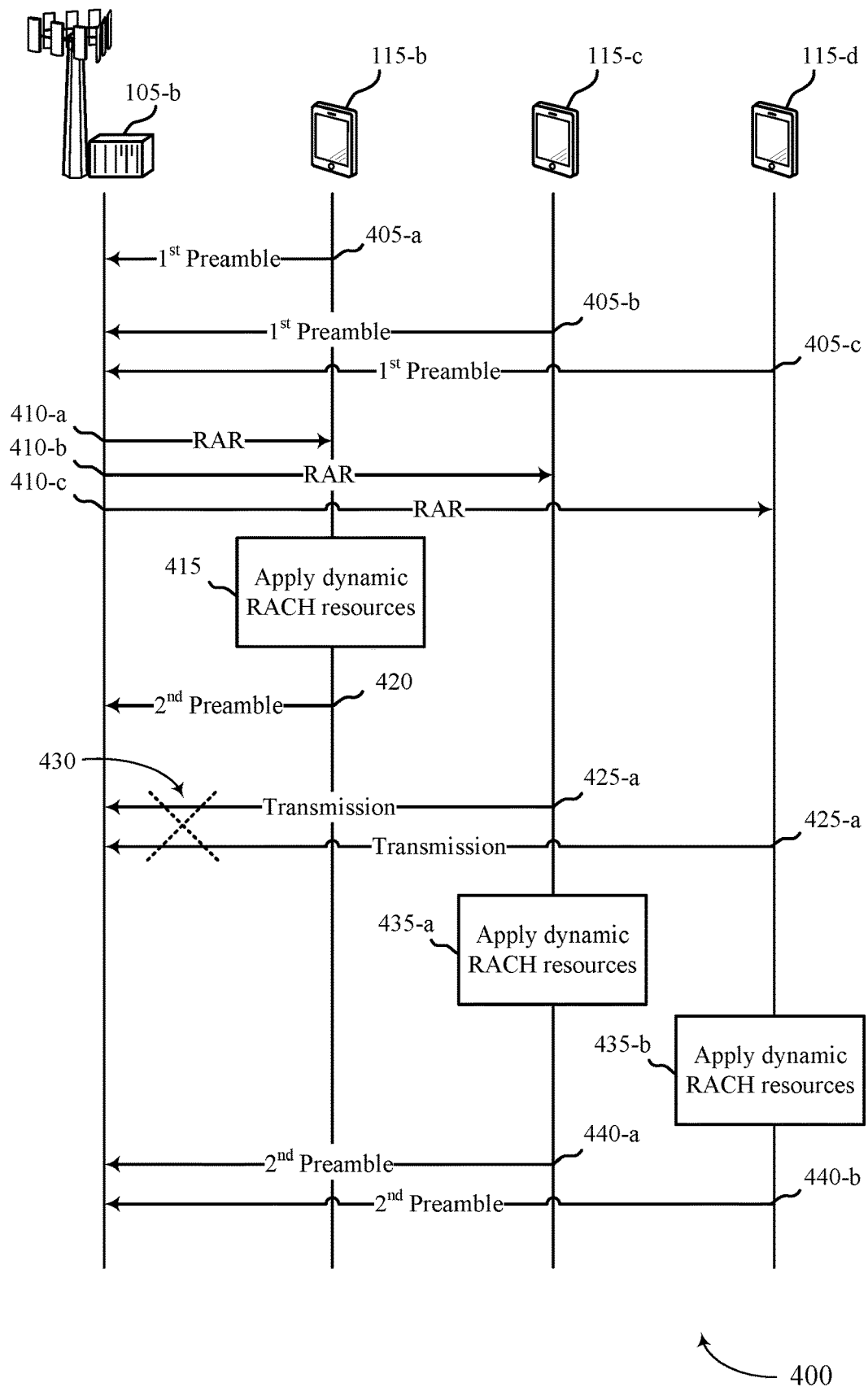
FIG. 4 illustrates an example of a process flow that supports mitigating access congestion on a wireless network in accordance with aspects of the present disclosure.

FIG. 4 illustrates an example of a process flow 400 that supports mitigating access congestion on a wireless network in accordance with aspects of the present disclosure.

At 405, UE 115-b transmits a first random access preamble to base station 105-b (e.g., in a first attempt at completing a random access procedure). In some cases, the first random access preamble of UE 115-b may include a preamble index associated with UE 115-b. Optionally, UE 115-c or UE 115-d, or both, may transmit respective first random access preambles to base station 105-b, where the respective first random access preambles include a preamble index associated with UE 115-c and/or UE 115-d, respectively.

At 410, base station 105-b may transmit a random access response to UE 115-b, UE 115-c, and UE 115-d. In some cases, the random access response may include a random access response of a 4-step random access procedure or a message B of a 2-step random access procedure. In some cases, the random access response may include dynamic random access resources in addition to random access resources broadcast by base station 105-b. In some cases, the dynamic random access resources may include an indication of a dynamic random access configuration (one or more random access channel masks). In some cases, the dynamic random access resources may include one or more sets of uplink grants (e.g., dynamic uplink grants), where each set of uplink grants includes two or more different uplink grants.

At 415, UE 115-b may apply the dynamic random access resources based on whether the random access response message from base station 105-b includes the preamble index associated with UE 115-b. When UE 115 determines that the random access response message from base station 105-b does not include its preamble index, UE 115-b may identify a random access channel mask of the dynamic random access configuration that indicates which random access occasion associated with the dynamic random access configuration that UE 115 may use for a next attempt at completing a random access procedure (e.g., for the next attempt only). In some cases, UE 115-b identifying the random access channel mask of the dynamic random access configuration may be based on a priority of UE 115-b. In some cases, UE 115-b may receive a list of priority levels from base station 105-b that indicates which UE priority levels are permitted to use the dynamic random access resources. In some cases, UE 115-b may use the dynamic random access resources based on a determination by UE 115-b that the priority level of UE 115-b is included in the list of priority levels.

At 420, UE 115-b may transmit a second random access preamble to base station 105-b in accordance with the applied dynamic random access configuration.

At 425, UE 115-c and UE 115-d may each send a transmission (e.g., data or control information, or both). In some cases, UE 115-c may use the same uplink grant, resulting in the transmissions colliding at base station 105-b and causing a random access failure. In some cases, UE 115-c and UE 115-d may happen to select (e.g., randomly select) and transmit the same random access preamble to base station 105-b (e.g., at 405-b and 405-c). In such cases, UE 115-c and UE 115-d may receive the same uplink grant assignment in the random access response message and then use the same uplink grant to access base station 105-b, resulting in the contention 430 at base station 105-b, which contention 430 results in the random access procedures of UE 115-c and UE 115-d failing. Thus, even though the random access response message includes the preamble index associated with the random access preamble each UE 115-c and UE 115-d sent to base station 105-b, the respective random access procedures of UE 115-c and UE 115-d may fail.

At 435, based on contention 430 (e.g., the respective random access failures), UE 115-c and UE 115-d may respectively apply the dynamic random access resources based on whether the random access response message from base station 105-b includes the respective preamble index associated with UE 115-b and UE 115-d. Accordingly, UE 115-c and UE 115-d may each randomly select an uplink grant from a set of uplink grants included in the dynamic random access resources, where the set of uplink grants is associated with the random access preamble each transmitted to base station 105-b. In some cases, UE 115-c and UE 115-d may each apply their respective randomly selected uplink grant to a second attempt at the random access procedure.

At 440, UE 115-c and UE 115-d may each transmit a second random access preamble to base station 105-b in accordance with the randomly selected uplink grant that UE 115-c and UE 115-d each selected and applied.

Figure 5:
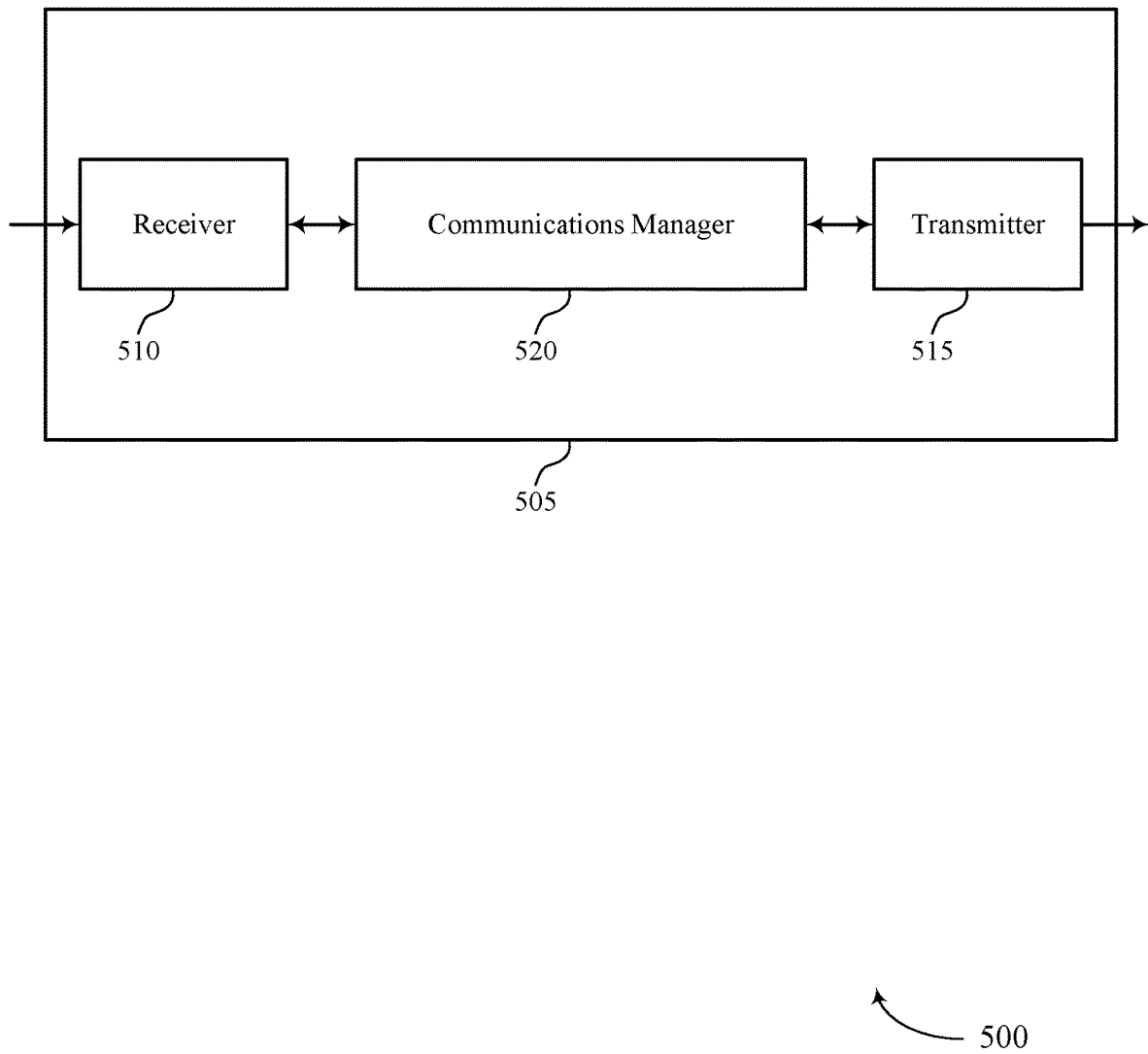
FIGS. 5 and 6 show block diagrams of devices that support mitigating access congestion on a wireless network in accordance with aspects of the present disclosure.

FIG. 5 shows a block diagram 500 of a device 505 that supports mitigating access congestion on a wireless network in accordance with aspects of the present disclosure. The device 505 may be an example of aspects of a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to mitigating access congestion on a wireless network). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to mitigating access congestion on a wireless network). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of mitigating access congestion on a wireless network as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 520, the receiver 510, the transmitter 515, or various combinations or components thereof may be implemented in code (e.g., as communications management software) executed by at least one processor. If implemented in code executed by at least one processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a network access control broadcast including access control criteria associated with connecting to a base station. The communications manager 520 may be configured as or otherwise support a means for determining an access category associated with the UE and an access identity of the UE associated with the access category, where the access category of the UE is specific to a reduced capability classification of the UE. The communications manager 520 may be configured as or otherwise support a means for selectively performing a random access procedure to connect to the base station in accordance with the access control criteria, the access identity of the UE, and the access category associated with the UE.

Additionally or alternatively, the communications manager 520 may support wireless communication at a UE in accordance with examples as disclosed herein. For example, the communications manager 520 may be configured as or otherwise support a means for transmitting a first random access preamble to a base station, the first random access preamble including a preamble index associated with the UE. The communications manager 520 may be configured as or otherwise support a means for receiving a random access response from the base station, the random access response including an indication of a dynamic random access configuration and a set of multiple dynamic uplink grants. The communications manager 520 may be configured as or otherwise support a means for applying either the dynamic random access configuration or a randomly selected uplink grant of the set of multiple dynamic uplink grants to the UE, where the applying is based on whether the random access response includes the preamble index associated with the UE. The communications manager 520 may be configured as or otherwise support a means for transmitting a second random access preamble to the base station in accordance with the applied dynamic random access configuration or the applied randomly selected uplink grant.

By including or configuring the communications manager 520 in accordance with examples as described herein, the device 505 (e.g., at least one processor controlling or otherwise coupled to the receiver 510, the transmitter 515, the communications manager 520, or a combination thereof) may support techniques for mitigating access congestion on a wireless network. The described techniques support improvements in access control and resource utilization such that access congestion on a wireless network is mitigated. Additionally, described techniques result in reduced processing, reduced power consumption, more efficient utilization of communication resources.

Figure 6:
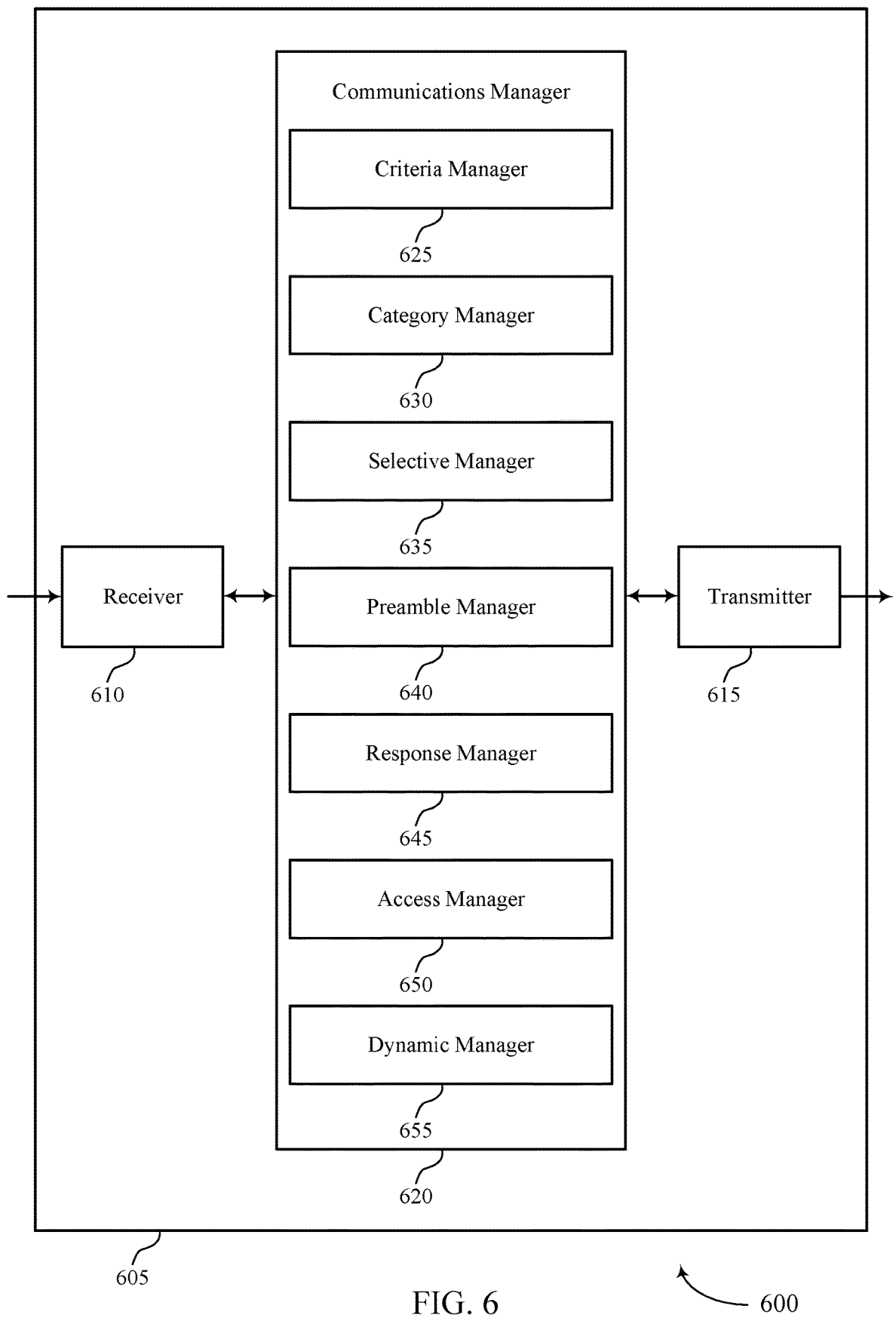

FIG. 6 shows a block diagram 600 of a device 605 that supports mitigating access congestion on a wireless network in accordance with aspects of the present disclosure. The device 605 may be an example of aspects of a device 505 or a UE 115 as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to mitigating access congestion on a wireless network). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to mitigating access congestion on a wireless network). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of mitigating access congestion on a wireless network as described herein. For example, the communications manager 620 may include a criteria manager 625, a category manager 630, a selective manager 635, a preamble manager 640, a response manager 645, an access manager 650, a dynamic manager 655, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The criteria manager 625 may be configured as or otherwise support a means for receiving a network access control broadcast including access control criteria associated with connecting to a base station. The category manager 630 may be configured as or otherwise support a means for determining an access category associated with the UE and an access identity of the UE associated with the access category, where the access category of the UE is specific to a reduced capability classification of the UE. The selective manager 635 may be configured as or otherwise support a means for selectively performing a random access procedure to connect to the base station in accordance with the access control criteria, the access identity of the UE, and the access category associated with the UE.

Additionally or alternatively, the communications manager 620 may support wireless communication at a UE in accordance with examples as disclosed herein. The preamble manager 640 may be configured as or otherwise support a means for transmitting a first random access preamble to a base station, the first random access preamble including a preamble index associated with the UE. The response manager 645 may be configured as or otherwise support a means for receiving a random access response from the base station, the random access response including an indication of a dynamic random access configuration and a set of multiple dynamic uplink grants. The access manager 650 may be configured as or otherwise support a means for applying either the dynamic random access configuration or a randomly selected uplink grant of the set of multiple dynamic uplink grants to the UE, where the applying is based on whether the random access response includes the preamble index associated with the UE. The dynamic manager 655 may be configured as or otherwise support a means for transmitting a second random access preamble to the base station in accordance with the applied dynamic random access configuration or the applied randomly selected uplink grant.

Figure 7:
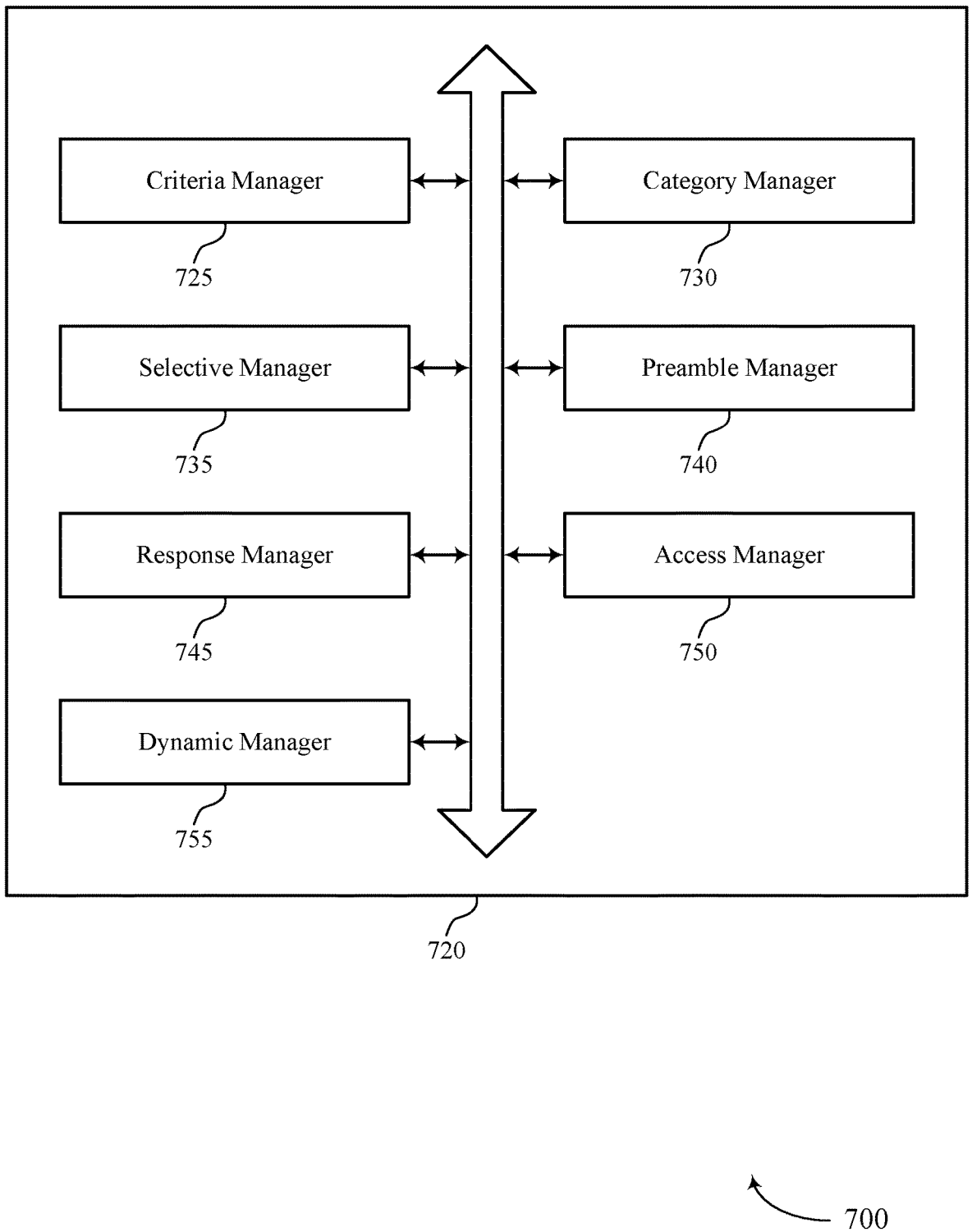
FIG. 7 shows a block diagram of a communications manager that supports mitigating access congestion on a wireless network in accordance with aspects of the present disclosure.

FIG. 7 shows a block diagram 700 of a communications manager 720 that supports mitigating access congestion on a wireless network in accordance with aspects of the present disclosure. The communications manager 720 may be an example of aspects of a communications manager 520, a communications manager 620, or both, as described herein. The communications manager 720, or various components thereof, may be an example of means for performing various aspects of mitigating access congestion on a wireless network as described herein. For example, the communications manager 720 may include a criteria manager 725, a category manager 730, a selective manager 735, a preamble manager 740, a response manager 745, an access manager 750, a dynamic manager 755, or any combination thereof. Each of these components may communicate, directly or indirectly, with one another (e.g., via one or more buses).

The communications manager 720 may support wireless communication at a UE in accordance with examples as disclosed herein. The criteria manager 725 may be configured as or otherwise support a means for receiving a network access control broadcast including access control criteria associated with connecting to a base station. In some examples, the network access control broadcast includes or is broadcast via one or more system information messages. The category manager 730 may be configured as or otherwise support a means for determining an access category associated with the UE and an access identity of the UE associated with the access category, where the access category of the UE is specific to a reduced capability classification of the UE. The selective manager 735 may be configured as or otherwise support a means for selectively performing a random access procedure to connect to the base station in accordance with the access control criteria, the access identity of the UE, and the access category associated with the UE.

In some examples, to support selectively performing the random access procedure, the selective manager 735 may be configured as or otherwise support a means for performing the random access procedure in accordance with determining from the access control criteria that the access identity of the UE has full access to the base station.

In some examples, to support receiving the network access control broadcast, the criteria manager 725 may be configured as or otherwise support a means for receiving, in a broadcast from the base station, a set of measurement thresholds associated with one or more synchronization signal blocks.

In some examples, the criteria manager 725 may be configured as or otherwise support a means for performing a reference signal received power measurement on the one or more of synchronization signal blocks. In some examples, the criteria manager 725 may be configured as or otherwise support a means for identifying a smallest threshold of the set of measurement thresholds that is greater than the reference signal received power measurement performed by the UE, where the access control criteria indicates a backoff period associated with the identified smallest threshold.

In some examples, selectively performing the random access procedure includes performing the random access procedure after the backoff period associated with the identified smallest threshold. In some examples, to support selectively performing the random access procedure, the criteria manager 725 may be configured as or otherwise support a means for performing the random access procedure in accordance with a probabilistic barring factor associated with the identified smallest threshold.

In some examples, the access identity of the UE is based on a number of receive antennas associated with the UE or a number of downlink layers supported by the UE. In some examples, one or more of the access identity of the UE or the access category of the UE is specific to an operator associated with the base station.

Additionally or alternatively, the communications manager 720 may support wireless communication at a UE in accordance with examples as disclosed herein. The preamble manager 740 may be configured as or otherwise support a means for transmitting a first random access preamble to a base station, the first random access preamble including a preamble index associated with the UE. The response manager 745 may be configured as or otherwise support a means for receiving a random access response from the base station, the random access response including an indication of a dynamic random access configuration and a set of multiple dynamic uplink grants. The access manager 750 may be configured as or otherwise support a means for applying either the dynamic random access configuration or a randomly selected uplink grant of the set of multiple dynamic uplink grants to the UE, where the applying is based on whether the random access response includes the preamble index associated with the UE. The dynamic manager 755 may be configured as or otherwise support a means for transmitting a second random access preamble to the base station in accordance with the applied dynamic random access configuration or the applied randomly selected uplink grant.

In some examples, to support applying either the dynamic random access configuration or the randomly selected uplink grant, the access manager 750 may be configured as or otherwise support a means for applying the dynamic random access configuration to the UE when the preamble index associated with the UE is absent from the random access response.

In some examples, the random access response includes an indication of a priority level associated with eligibility to use the dynamic random access configuration. In some examples, applying the dynamic random access configuration is further based on a comparison of a priority level associated with the UE and the priority level associated with eligibility to use the dynamic random access configuration. In some examples, the dynamic random access configuration is applied at the UE instead of a broadcast random access configuration.

In some examples, to support applying either the dynamic random access configuration or the randomly selected uplink grant, the access manager 750 may be configured as or otherwise support a means for applying the randomly selected uplink grant to the UE when the random access response includes the preamble index associated with the UE.

In some examples, the random access response associates the set of multiple dynamic uplink grants with the preamble index associated with the UE. In some examples, each of the set of multiple dynamic uplink grants includes a unique temporary cell radio network temporary identifier (TC-RNTI).

Figure 8:
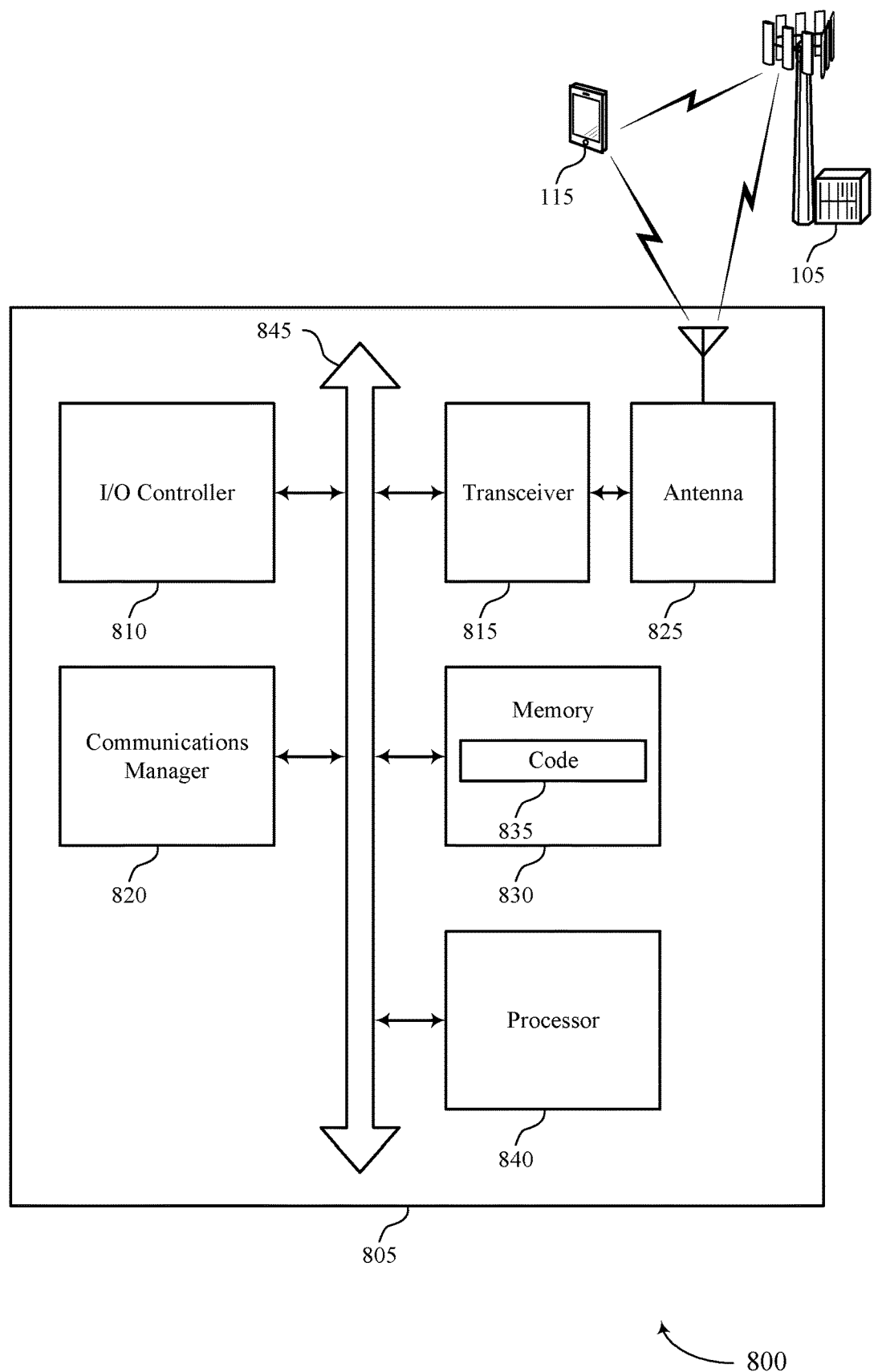
FIG. 8 shows a diagram of a system including a device that supports mitigating access congestion on a wireless network in accordance with aspects of the present disclosure.

FIG. 8 shows a diagram of a system 800 including a device 805 that supports mitigating access congestion on a wireless network in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of at least one processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., at least one processor, at least one general-purpose processor, at least one DSP, at least one CPU, at least one microcontroller, at least one ASIC, at least one FPGA, at least one programmable logic device, at least one discrete gate or transistor logic component, at least one discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting mitigating access congestion on a wireless network). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a network access control broadcast including access control criteria associated with connecting to a base station. The communications manager 820 may be configured as or otherwise support a means for determining an access category associated with the UE and an access identity of the UE associated with the access category, where the access category of the UE is specific to a reduced capability classification of the UE. The communications manager 820 may be configured as or otherwise support a means for selectively performing a random access procedure to connect to the base station in accordance with the access control criteria, the access identity of the UE, and the access category associated with the UE.

Additionally or alternatively, the communications manager 820 may support wireless communication at a UE in accordance with examples as disclosed herein. For example, the communications manager 820 may be configured as or otherwise support a means for transmitting a first random access preamble to a base station, the first random access preamble including a preamble index associated with the UE. The communications manager 820 may be configured as or otherwise support a means for receiving a random access response from the base station, the random access response including an indication of a dynamic random access configuration and a set of multiple dynamic uplink grants. The communications manager 820 may be configured as or otherwise support a means for applying either the dynamic random access configuration or a randomly selected uplink grant of the set of multiple dynamic uplink grants to the UE, where the applying is based on whether the random access response includes the preamble index associated with the UE. The communications manager 820 may be configured as or otherwise support a means for transmitting a second random access preamble to the base station in accordance with the applied dynamic random access configuration or the applied randomly selected uplink grant.

By including or configuring the communications manager 820 in accordance with examples as described herein, the device 805 may support techniques for mitigating access congestion on a wireless network. The described techniques support improvements in access control and resource utilization such that access congestion on a wireless network is mitigated. Additionally, described techniques result in improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of mitigating access congestion on a wireless network as described herein, or the processor 840 and the memory 830 may be otherwise configured to perform or support such operations.

Figure 9:
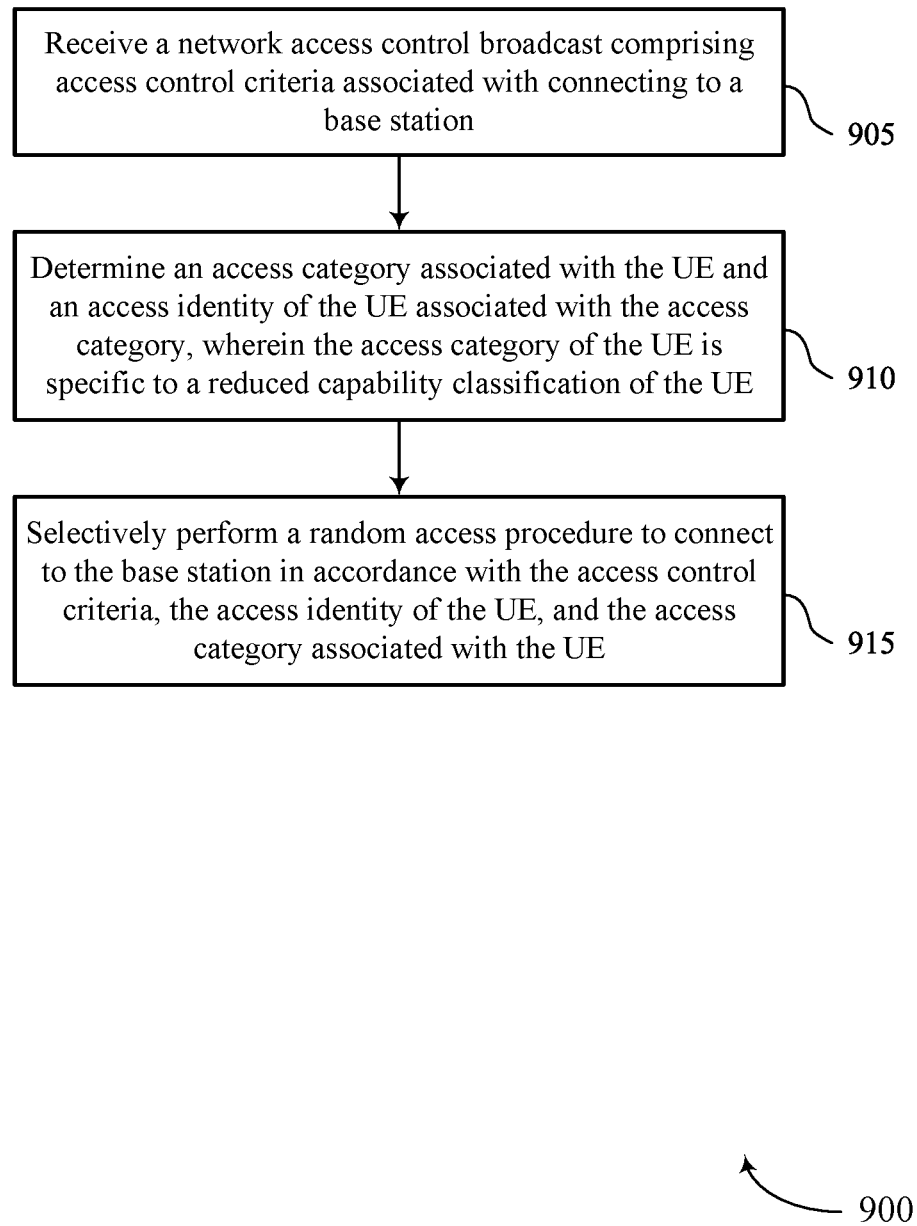
FIGS. 9 through 12 show flowcharts illustrating methods that support mitigating access congestion on a wireless network in accordance with aspects of the present disclosure.

FIG. 9 shows a flowchart illustrating a method 900 that supports mitigating access congestion on a wireless network in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a network access control broadcast including access control criteria associated with connecting to a base station. The operations of 905 may be performed in accordance with examples as disclosed herein. In some examples, aspects of the operations of 905 may be performed by a criteria manager 725 as described with reference to FIG. 7.

At 910, the method may include determining an access category associated with the UE and an access identity of the UE associated with the access category, where the access category of the UE is specific to a reduced capability classification of the UE. The operations of 910 may be performed in accordance with examples as disclosed herein. In some examples, aspects of the operations of 910 may be performed by a category manager 730 as described with reference to FIG. 7.

At 915, the method may include selectively performing a random access procedure to connect to the base station in accordance with the access control criteria, the access identity of the UE, and the access category associated with the UE. The operations of 915 may be performed in accordance with examples as disclosed herein. In some examples, aspects of the operations of 915 may be performed by a selective manager 735 as described with reference to FIG. 7.

Figure 10:
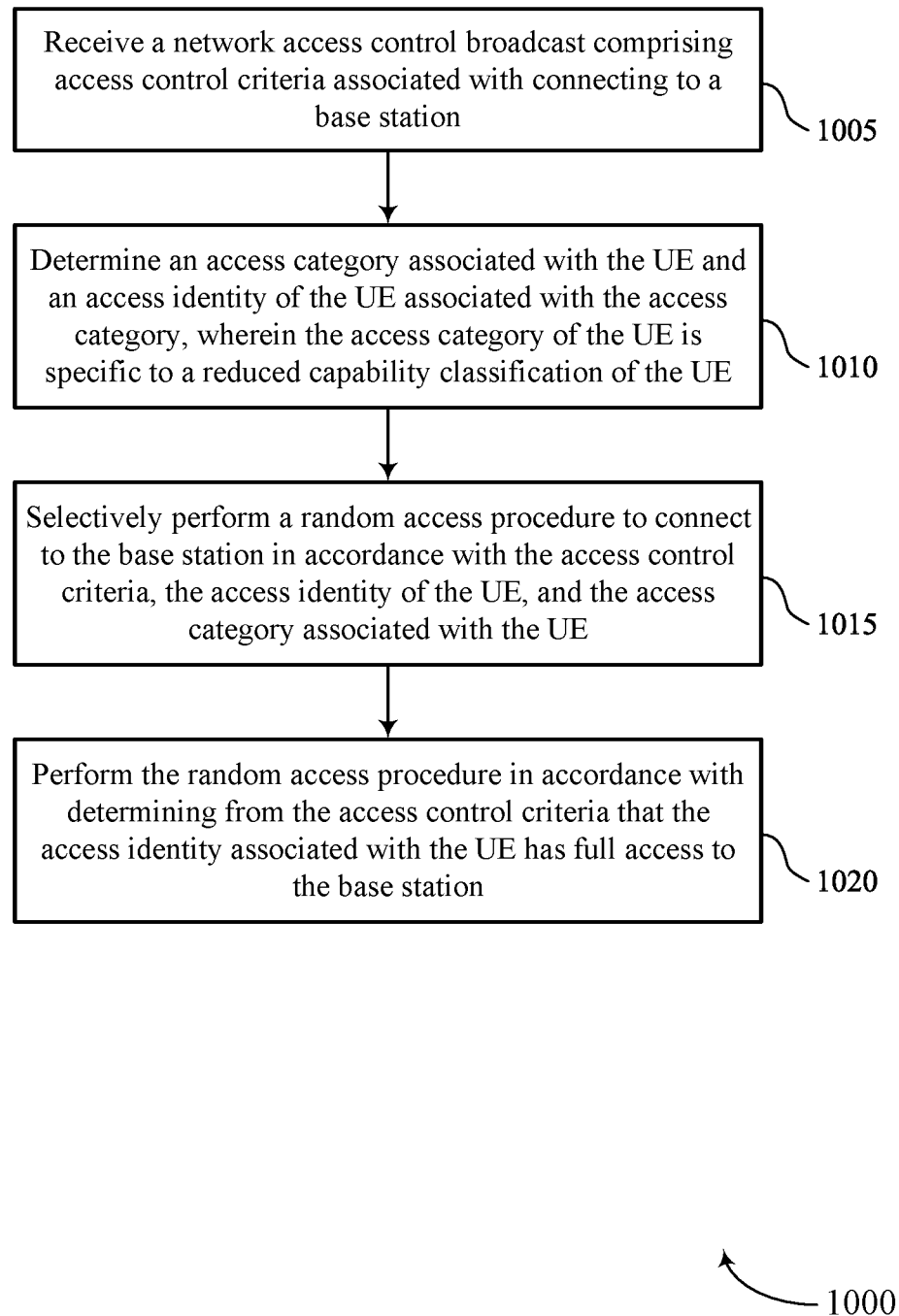

FIG. 10 shows a flowchart illustrating a method 1000 that supports mitigating access congestion on a wireless network in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a network access control broadcast including access control criteria associated with connecting to a base station. The operations of 1005 may be performed in accordance with examples as disclosed herein. In some examples, aspects of the operations of 1005 may be performed by a criteria manager 725 as described with reference to FIG. 7.

At 1010, the method may include determining an access category associated with the UE and an access identity of the UE associated with the access category, where the access category of the UE is specific to a reduced capability classification of the UE. The operations of 1010 may be performed in accordance with examples as disclosed herein. In some examples, aspects of the operations of 1010 may be performed by a category manager 730 as described with reference to FIG. 7.

At 1015, the method may include selectively performing a random access procedure to connect to the base station in accordance with the access control criteria, the access identity of the UE, and the access category associated with the UE. The operations of 1015 may be performed in accordance with examples as disclosed herein. In some examples, aspects of the operations of 1015 may be performed by a selective manager 735 as described with reference to FIG. 7.

At 1020, the method may include performing the random access procedure in accordance with determining from the access control criteria that the access identity of the UE has full access to the base station. The operations of 1020 may be performed in accordance with examples as disclosed herein. In some examples, aspects of the operations of 1020 may be performed by a selective manager 735 as described with reference to FIG. 7.

Figure 11:
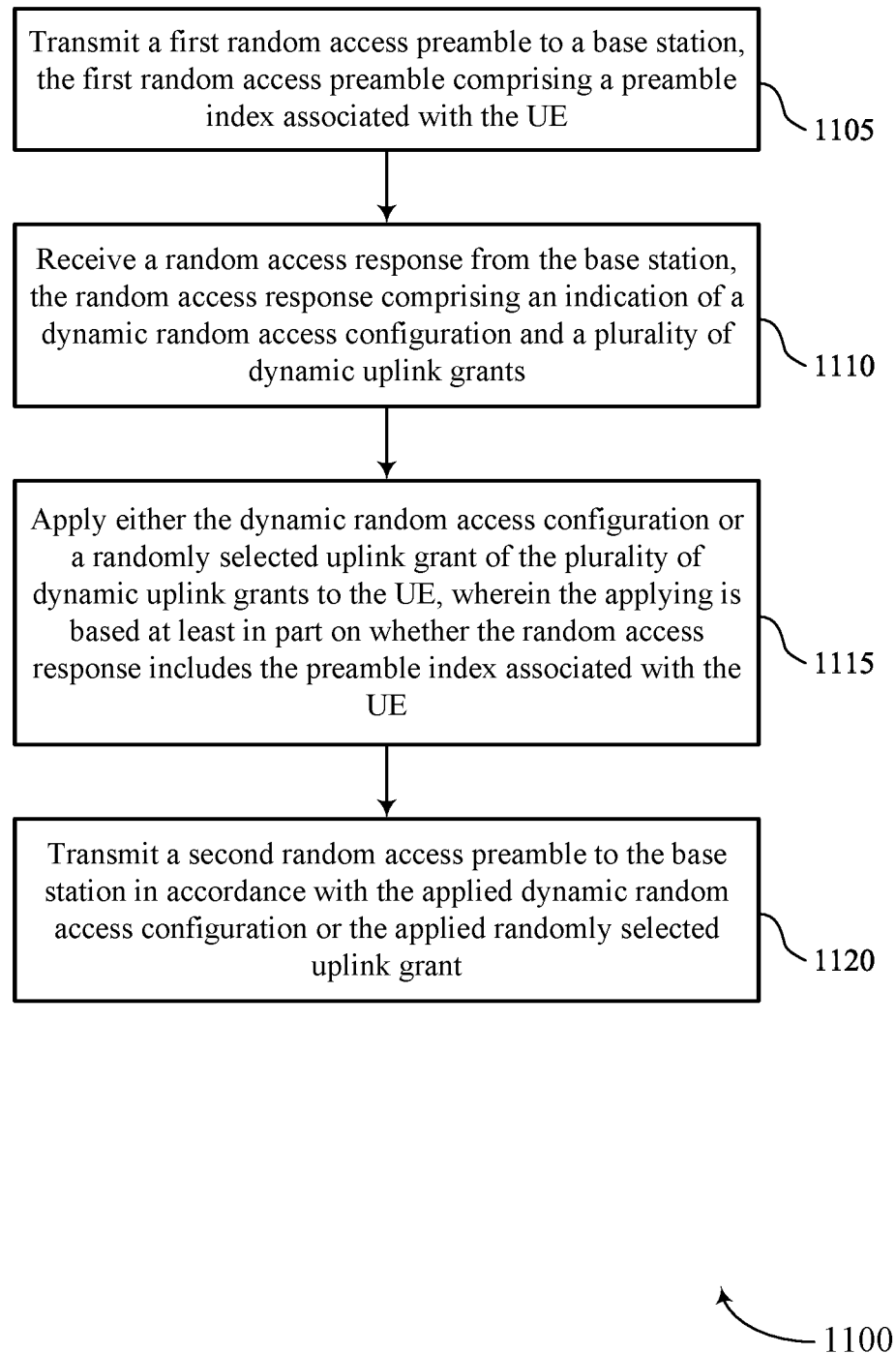

FIG. 11 shows a flowchart illustrating a method 1100 that supports mitigating access congestion on a wireless network in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting a first random access preamble to a base station, the first random access preamble including a preamble index associated with the UE. The operations of 1105 may be performed in accordance with examples as disclosed herein. In some examples, aspects of the operations of 1105 may be performed by a preamble manager 740 as described with reference to FIG. 7.

At 1110, the method may include receiving a random access response from the base station, the random access response including an indication of a dynamic random access configuration and a set of multiple dynamic uplink grants. The operations of 1110 may be performed in accordance with examples as disclosed herein. In some examples, aspects of the operations of 1110 may be performed by a response manager 745 as described with reference to FIG. 7.

At 1115, the method may include applying either the dynamic random access configuration or a randomly selected uplink grant of the set of multiple dynamic uplink grants to the UE, where the applying is based on whether the random access response includes the preamble index associated with the UE. The operations of 1115 may be performed in accordance with examples as disclosed herein. In some examples, aspects of the operations of 1115 may be performed by an access manager 750 as described with reference to FIG. 7.

At 1120, the method may include transmitting a second random access preamble to the base station in accordance with the applied dynamic random access configuration or the applied randomly selected uplink grant. The operations of 1120 may be performed in accordance with examples as disclosed herein. In some examples, aspects of the operations of 1120 may be performed by a dynamic manager 755 as described with reference to FIG. 7.

Figure 12:
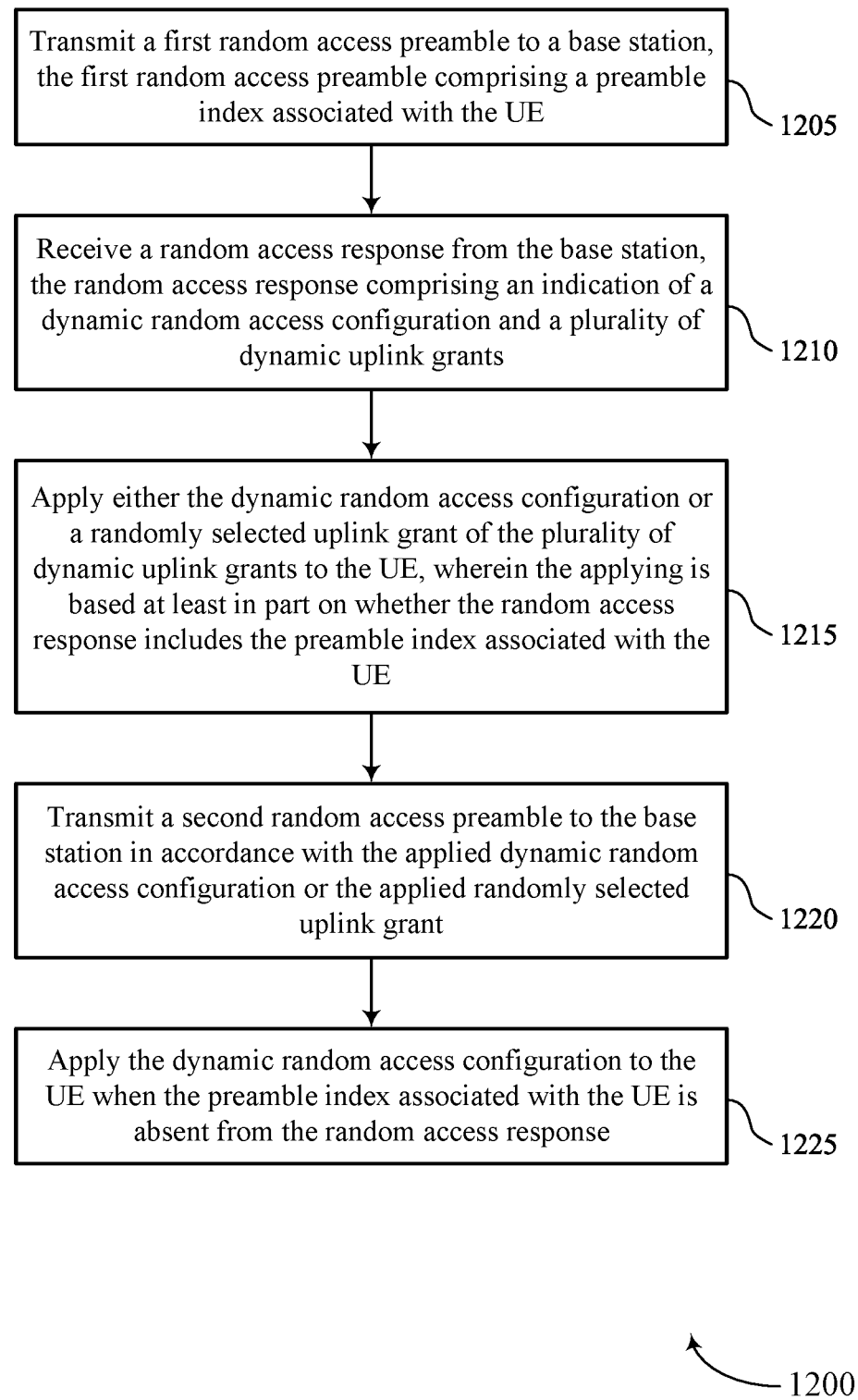

FIG. 12 shows a flowchart illustrating a method 1200 that supports mitigating access congestion on a wireless network in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting a first random access preamble to a base station, the first random access preamble including a preamble index associated with the UE. The operations of 1205 may be performed in accordance with examples as disclosed herein. In some examples, aspects of the operations of 1205 may be performed by a preamble manager 740 as described with reference to FIG. 7.

At 1210, the method may include receiving a random access response from the base station, the random access response including an indication of a dynamic random access configuration and a set of multiple dynamic uplink grants. The operations of 1210 may be performed in accordance with examples as disclosed herein. In some examples, aspects of the operations of 1210 may be performed by a response manager 745 as described with reference to FIG. 7.

At 1215, the method may include applying either the dynamic random access configuration or a randomly selected uplink grant of the set of multiple dynamic uplink grants to the UE, where the applying is based on whether the random access response includes the preamble index associated with the UE. The operations of 1215 may be performed in accordance with examples as disclosed herein. In some examples, aspects of the operations of 1215 may be performed by an access manager 750 as described with reference to FIG. 7.

At 1220, the method may include transmitting a second random access preamble to the base station in accordance with the applied dynamic random access configuration or the applied randomly selected uplink grant. The operations of 1220 may be performed in accordance with examples as disclosed herein. In some examples, aspects of the operations of 1220 may be performed by a dynamic manager 755 as described with reference to FIG. 7.

At 1225, the method may include applying the dynamic random access configuration to the UE when the preamble index associated with the UE is absent from the random access response. The operations of 1225 may be performed in accordance with examples as disclosed herein. In some examples, aspects of the operations of 1225 may be performed by an access manager 750 as described with reference to FIG. 7.

The following provides an overview of aspects of the present disclosure:

Aspect 1: A method for wireless communication at a UE, comprising: receiving a network access control broadcast comprising access control criteria associated with connecting to a base station; determining an access category associated with the UE and an access identity of the UE associated with the access category, wherein the access category of the UE is specific to a reduced capability classification of the UE; and selectively performing a random access procedure to connect to the base station in accordance with the access control criteria, the access identity of the UE, and the access category associated with the UE.

Aspect 2: The method of aspect 1, wherein selectively performing the random access procedure further comprises: performing the random access procedure in accordance with determining from the access control criteria that the access identity of the UE has full access to the base station.

Aspect 3: The method of any of aspects 1 through 2, wherein receiving the network access control broadcast further comprises: receiving, in a broadcast from the base station, a set of measurement thresholds associated with one or more synchronization signal blocks.

Aspect 4: The method of aspect 3, further comprising: performing a reference signal received power measurement on the one or more of synchronization signal blocks; and identifying a smallest threshold of the set of measurement thresholds that is greater than the reference signal received power measurement performed by the UE, wherein the access control criteria indicates a backoff period associated with the identified smallest threshold.

Aspect 5: The method of aspect 4, wherein selectively performing the random access procedure comprises performing the random access procedure after the backoff period associated with the identified smallest threshold.

Aspect 6: The method of any of aspects 3 through 5, wherein selectively performing the random access procedure comprises: performing the random access procedure in accordance with a probabilistic barring factor associated with the identified smallest threshold.

Aspect 7: The method of any of aspects 1 through 6, wherein the access identity of the UE is based at least in part on a number of receive antennas associated with the UE or a number of downlink layers supported by the UE.

Aspect 8: The method of any of aspects 1 through 7, wherein one or more of the access identity of the UE or the access category of the UE is specific to an operator associated with the base station.

Aspect 9: The method of any of aspects 1 through 8, wherein the network access control broadcast comprises a system information message.

Aspect 10: A method for wireless communication at a UE, comprising: transmitting a first random access preamble to a base station, the first random access preamble comprising a preamble index associated with the UE; receiving a random access response from the base station, the random access response comprising an indication of a dynamic random access configuration and a plurality of dynamic uplink grants; applying either the dynamic random access configuration or a randomly selected uplink grant of the plurality of dynamic uplink grants to the UE, wherein the applying is based at least in part on whether the random access response includes the preamble index associated with the UE; and transmitting a second random access preamble to the base station in accordance with the applied dynamic random access configuration or the applied randomly selected uplink grant.

Aspect 11: The method of aspect 10, wherein applying either the dynamic random access configuration or the randomly selected uplink grant comprises: applying the dynamic random access configuration to the UE when the preamble index associated with the UE is absent from the random access response.

Aspect 12: The method of aspect 11, wherein the random access response comprises an indication of a priority level associated with eligibility to use the dynamic random access configuration, and applying the dynamic random access configuration is further based at least in part on a comparison of a priority level associated with the UE and the priority level associated with eligibility to use the dynamic random access configuration.

Aspect 13: The method of any of aspects 11 through 12, wherein the dynamic random access configuration is applied at the UE instead of a broadcast random access configuration.

Aspect 14: The method of any of aspects 10 through 13, wherein applying either the dynamic random access configuration or the randomly selected uplink grant comprises: applying the randomly selected uplink grant to the UE when the random access response includes the preamble index associated with the UE.

Aspect 15: The method of aspect 14, wherein the random access response associates the plurality of dynamic uplink grants with the preamble index associated with the UE, and each of the plurality of dynamic uplink grants comprises a unique temporary cell radio network temporary identifier (TC-RNTI).

Aspect 16: An apparatus for wireless communication at a UE, comprising at least one processor; memory coupled with the at least one processor; and instructions stored in the memory and executable by the at least one processor to cause the apparatus to perform a method of any of aspects 1 through 9.

Aspect 17: An apparatus for wireless communication at a UE, comprising at least one means for performing a method of any of aspects 1 through 9.

Aspect 18: A non-transitory computer-readable medium storing code for wireless communication at a UE, the code comprising instructions executable by a processor to perform a method of any of aspects 1 through 9.

Aspect 19: An apparatus for wireless communication at a UE, comprising at least one processor; memory coupled with the at least one processor; and instructions stored in the memory and executable by the at least one processor to cause the apparatus to perform a method of any of aspects 10 through 15.

Aspect 20: An apparatus for wireless communication at a UE, comprising at least one means for performing a method of any of aspects 10 through 15.

Aspect 21: A non-transitory computer-readable medium storing code for wireless communication at a UE, the code comprising instructions executable by a processor to perform a method of any of aspects 10 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    one or more memories storing processor-executable code; and
    one or more processors coupled with the one or more memories and individually or collectively operable to execute the code to cause the UE to:
        receive a network access control broadcast comprising access control criteria associated with connecting to a network device and comprising a set of measurement thresholds associated with one or more synchronization signal blocks;
        determine an access category associated with the UE and an access identity of the UE associated with the access category, wherein the access category of the UE is specific to a reduced capability classification of the UE; and selectively perform a random access procedure to connect to the network device based at least in part on the set of measurement thresholds in accordance with the access control criteria, the access identity of the UE, and the access category associated with the UE.

2. The apparatus of claim 1, wherein, to selectively perform the random access procedure, the one or more processors are individually or collectively operable to execute the code to cause the UE to:

perform the random access procedure in accordance with determining from the access control criteria that the access identity of the UE has full access to the network device.

3. The apparatus of claim 1, wherein the one or more processors are individually or collectively further operable to execute the code to cause the UE to:

perform a reference signal received power measurement on the one or more synchronization signal blocks; and identify a smallest threshold of the set of measurement thresholds that is greater than the reference signal received power measurement performed by the UE, wherein the access control criteria indicates a backoff period associated with the identified smallest threshold.

4. The apparatus of claim 3, wherein, to selectively perform the random access procedure, the one or more processors are individually or collectively operable to execute the code to cause the UE to perform the random access procedure after the backoff period associated with the identified smallest threshold.

5. The apparatus of claim 3, wherein, to selectively perform the random access procedure, the one or more processors are individually or collectively operable to execute the code to cause the UE to:

perform the random access procedure in accordance with a probabilistic barring factor associated with the identified smallest threshold.

6. The apparatus of claim 1, wherein the access identity of the UE is based at least in part on a number of receive antennas associated with the UE or a number of downlink layers supported by the UE.

7. The apparatus of claim 1, wherein one or more of the access identity of the UE or the access category of the UE is specific to an operator associated with the network device.

8. The apparatus of claim 1, wherein the network access control broadcast comprises a system information message.

9. A method for wireless communication at a user equipment (UE), comprising:

receiving a network access control broadcast comprising access control criteria associated with connecting to a network device and comprising a set of measurement thresholds associated with one or more synchronization signal blocks;

determining an access category associated with the UE and an access identity of the UE associated with the access category, wherein the access category of the UE is specific to a reduced capability classification of the UE; and selectively performing a random access procedure to connect to the network device based at least in part on the set of measurement thresholds in accordance with the access control criteria, the access identity of the UE, and the access category associated with the UE.

10. The method of claim 9, wherein selectively performing the random access procedure further comprises:

performing the random access procedure in accordance with determining from the access control criteria that the access identity of the UE has full access to the network device.

11. The method of claim 9, further comprising:

performing a reference signal received power measurement on the one or more synchronization signal blocks; and identifying a smallest threshold of the set of measurement thresholds that is greater than the reference signal received power measurement performed by the UE, wherein the access control criteria indicates a backoff period associated with the identified smallest threshold.

12. The method of claim 11, wherein selectively performing the random access procedure comprises performing the random access procedure after the backoff period associated with the identified smallest threshold.

13. The method of claim 11, wherein selectively performing the random access procedure comprises:

performing the random access procedure in accordance with a probabilistic barring factor associated with the identified smallest threshold.

14. The method of claim 9, wherein the access identity of the UE is based at least in part on a number of receive antennas associated with the UE or a number of downlink layers supported by the UE.

15. The method of claim 9, wherein one or more of the access identity of the UE or the access category of the UE is specific to an operator associated with the network device.

16. The method of claim 9, wherein the network access control broadcast comprises a system information message.

17. An apparatus for wireless communication at a user equipment (UE), comprising:

means for receiving a network access control broadcast comprising access control criteria associated with connecting to a network device and comprising a set of measurement thresholds associated with one or more synchronization signal blocks;

means for determining an access category associated with the UE and an access identity associated with the access category, wherein the access category of the UE is specific to a reduced capability classification of the UE; and means for selectively performing a random access procedure to connect to the network device based at least in part on the set of measurement thresholds in accordance with the access control criteria, the access identity of the UE, and the access category associated with the UE.

18. The apparatus of claim 17, wherein the means for selectively performing the random access procedure further comprise:

means for performing the random access procedure in accordance with determining from the access control criteria that the access identity associated with the UE has full access to the network device.

19. The apparatus of claim 17, further comprising:

means for performing a reference signal received power measurement on the one or more synchronization signal blocks; and means for identifying a smallest threshold of the set of measurement thresholds that is greater than the reference signal received power measurement performed by the UE, wherein the access control criteria indicates a backoff period associated with the identified smallest threshold.

20. The apparatus of claim 19, wherein selectively performing the random access procedure comprises performing the random access procedure after the backoff period associated with the identified smallest threshold.

21. The apparatus of claim 19, wherein the means for selectively performing the random access procedure comprise:
means for performing the random access procedure in accordance with a probabilistic barring factor associated with the identified smallest threshold.

22. A non-transitory computer-readable medium storing code for wireless communication at a user equipment (UE), the code comprising instructions executable by one or more processors to:
receive a network access control broadcast comprising access control criteria associated with connecting to a network device and comprising a set of measurement thresholds associated with one or more synchronization signal blocks;
determine an access category associated with the UE and an access identity associated with the access category, wherein the access category of the UE is specific to a reduced capability classification of the UE; and
selectively perform a random access procedure to connect to the network device based at least in part on the set of measurement thresholds in accordance with the access control criteria, the access identity of the UE, and the access category associated with the UE.

23. The non-transitory computer-readable medium of claim 22, wherein the instructions to selectively perform the random access procedure are further executable by the one or more processors to:
perform the random access procedure in accordance with determining from the access control criteria that the access identity associated with the UE has full access to the network device.

24. The non-transitory computer-readable medium of claim 22, wherein the instructions are further executable by the one or more processors to:
perform a reference signal received power measurement on the one or more synchronization signal blocks; and
identify a smallest threshold of the set of measurement thresholds that is greater than the reference signal received power measurement performed by the UE, wherein the access control criteria indicates a backoff period associated with the identified smallest threshold.

25. The non-transitory computer-readable medium of claim 24, wherein selectively performing the random access procedure comprises performing the random access procedure after the backoff period associated with the identified smallest threshold.

26. The non-transitory computer-readable medium of claim 24, wherein the instructions to selectively perform the random access procedure are executable by the one or more processors:
perform the random access procedure in accordance with a probabilistic barring factor associated with the identified smallest threshold.

* * * * *